US008849307B2

(12) United States Patent
Terada et al.

(10) Patent No.: US 8,849,307 B2
(45) Date of Patent: Sep. 30, 2014

(54) TERMINAL NUMBER ESTIMATION DEVICE AND TERMINAL NUMBER ESTIMATION METHOD

(75) Inventors: Masayuki Terada, Chiyoda-ku (JP); Takayasu Yamaguchi, Chiyoda-ku (JP); Ichiro Okajima, Chiyoda-ku (JP)

(73) Assignee: NTT DoCoMo, Inc., Tokyo (JP)

(*) Notice: Subject to any disclaimer, the term of this patent is extended or adjusted under 35 U.S.C. 154(b) by 17 days.

(21) Appl. No.: 13/825,916

(22) PCT Filed: Feb. 10, 2012

(86) PCT No.: PCT/JP2012/053194
§ 371 (c)(1),
(2), (4) Date: Mar. 25, 2013

(87) PCT Pub. No.: WO2012/108539
PCT Pub. Date: Aug. 16, 2012

(65) Prior Publication Data
US 2013/0184008 A1    Jul. 18, 2013

(30) Foreign Application Priority Data

Feb. 10, 2011  (JP) ................................. 2011-027852
Mar. 31, 2011  (JP) ................................. 2011-080199

(51) Int. Cl.
*H04W 24/00*    (2009.01)
*H04W 4/00*     (2009.01)
*H04W 64/00*    (2009.01)

(52) U.S. Cl.
CPC .................................. *H04W 64/00* (2013.01); *H04W 24/00* (2013.01)
USPC .................................... 455/456.1; 455/435.1

(58) Field of Classification Search
USPC ......... 455/456.1–456.6, 418–420, 435.1, 446
See application file for complete search history.

(56) References Cited

U.S. PATENT DOCUMENTS

2012/0149387 A1*  6/2012  Rawat et al. ............... 455/456.1

FOREIGN PATENT DOCUMENTS

JP       2003 122877      4/2003

OTHER PUBLICATIONS

International Preliminary Report on Patentability and Written Opinion issued Sep. 19, 2013, in International Application No. PCT/JP2012/053194.

* cited by examiner

*Primary Examiner* — Brandon Miller
(74) *Attorney, Agent, or Firm* — Oblon, Spivak, McClelland, Maier & Neustadt, L.L.P.

(57) ABSTRACT

A terminal number estimation device includes a first location information acquisition unit containing a terminal ID and an area ID identifying a location area of a mobile terminal, a second location information acquisition unit that acquires second location information containing a terminal ID and coordinate information of the mobile terminal, a correspondence information generation unit that generates correspondence information based on the area ID and the coordinate information using the first and the second location information, an area information acquisition unit that acquires area information containing an area ID and area range information about an area range of an area identified by the area ID, an in-area terminal number acquisition unit that acquires the number of in-area mobile terminals, and a terminal number correction unit that corrects the number of terminals based on the correspondence information and the area information.

12 Claims, 29 Drawing Sheets

Fig.3

| | TERMINAL ID | FIRST TIME INFORMATION | AREA ID |
|---|---|---|---|
| D1 | 1 | 2010/12/11 8:20 | A |
| D2 | 2 | 2010/12/11 8:20 | B |
| D3 | 1 | 2010/12/11 8:50 | G |
| D4 | 3 | 2010/12/11 8:55 | A |
| | ⋮ | ⋮ | ⋮ |
| | ⋮ | ⋮ | ⋮ |

Fig.4

| | TERMINAL ID | SECOND TIME INFORMATION | COORDINATE INFORMATION |
|---|---|---|---|
| E1 | 1 | 2010/12/11 8:20 | (x1, y1) |
| E2 | 2 | 2010/12/11 8:22 | (x2, y2) |
| E3 | 3 | 2010/12/11 8:50 | (x3, y3) |
| E4 | 1 | 2010/12/11 9:30 | (x4, y4) |
| | ⋮ | ⋮ | ⋮ |
| | ⋮ | ⋮ | ⋮ |

Fig.5

| | AREA ID | COORDINATE INFORMATION | TIME DIFFERENCE INFORMATION |
|---|---|---|---|
| M1 | A | (x1, y1) | 0:00 |
| M2 | B | (x2, y2) | 0:02 |
| M3 | A | (x3, y3) | 0:05 |
| | ⋮ | ⋮ | ⋮ |
| | ⋮ | ⋮ | ⋮ |

Fig.17

| TIME | GPS INFORMATION ||||  AREA INFORMATION ||||
| | LATITUDE | LONGITUDE | ERROR RADIUS | ACCURACY | CONNECTED AREA || CONNECTION CANDIDATE AREA ||
| | | | | | AREA ID | RECEPTION LEVEL | AREA ID | RECEPTION LEVEL |
|---|---|---|---|---|---|---|---|---|
| 0:00 | 0.0 | 1.7 | 100 | 5.3 | A | -3 | B | -7 |
| 0:01 | 1.2 | 1.3 | 0 | 6.0 | A | -2 | B | -6 |
| 0:02 | 8.8 | 0.6 | 500 | 0.9 | B | -1 | A | -5 |
| 0:04 | 1.6 | 2.6 | 200 | 4.1 | A | -2 | B | -6 |
| ... | ... | ... | ... | ... | ... | ... | ... | ... |

Fig.18

| AREA ID | COORDINATE INFORMATION |
|---------|------------------------|
| A | (x1, y1) |
| B | (x2, y2) |
| G | (x3, y3) |
| A | (x4, y4) |
| ⋮ | ⋮ |

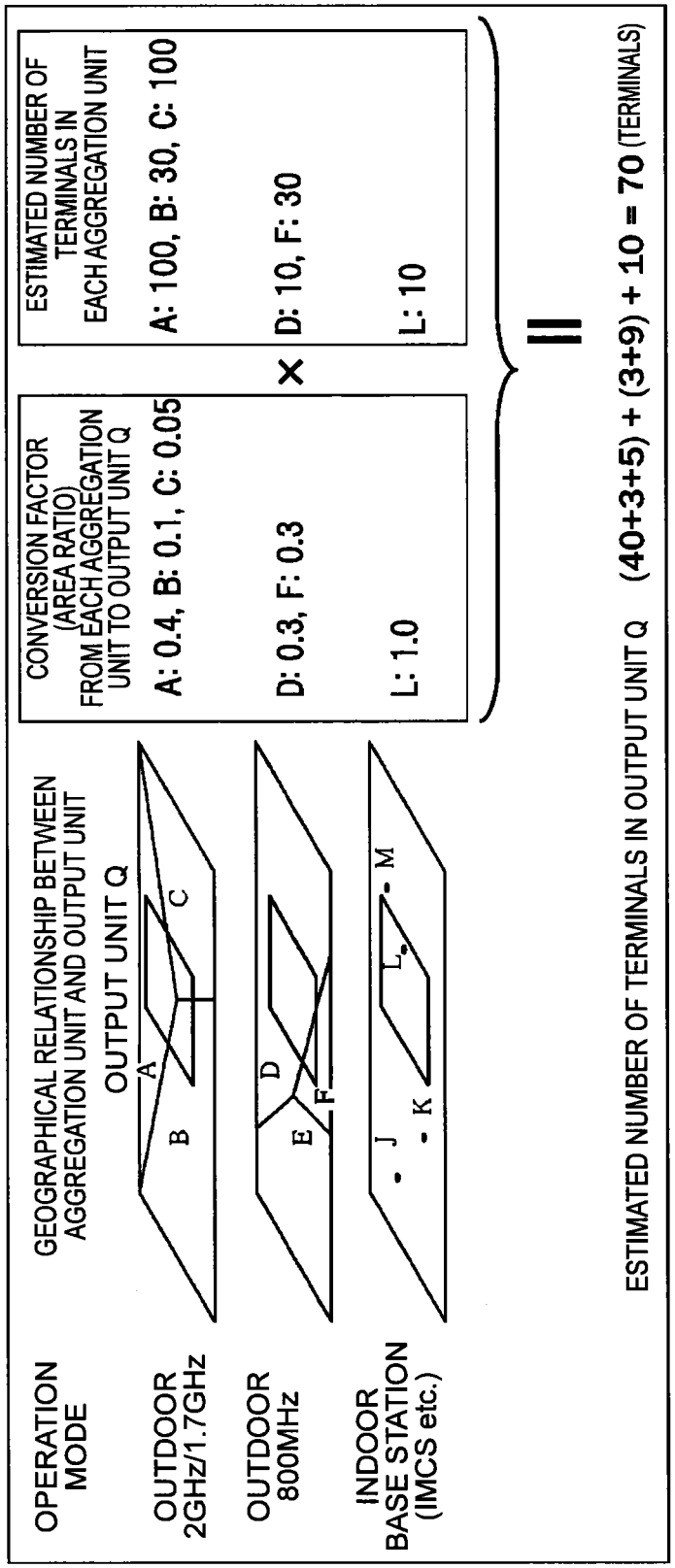

Fig.27

$$\begin{Bmatrix} Pop_{a_1} \\ Pop_{a_2} \\ Pop_{a_3} \\ \vdots \\ Pop_{a_n} \end{Bmatrix} = \begin{Bmatrix} k_{b_1 \to a_1} & k_{b_2 \to a_1} & k_{b_3 \to a_1} & \cdots & k_{b_m \to a_1} \\ k_{b_1 \to a_2} & k_{b_2 \to a_2} & k_{b_3 \to a_2} & \cdots & k_{b_m \to a_2} \\ k_{b_1 \to a_3} & k_{b_2 \to a_3} & k_{b_3 \to a_3} & \cdots & k_{b_m \to a_3} \\ \vdots & \vdots & \vdots & \cdots & \vdots \\ k_{b_1 \to a_n} & k_{b_2 \to a_n} & k_{b_3 \to a_n} & \cdots & k_{b_m \to a_n} \end{Bmatrix} \begin{Bmatrix} Pop_{b_1} \\ Pop_{b_2} \\ Pop_{b_3} \\ \vdots \\ Pop_{b_m} \end{Bmatrix}$$

Columns of conversion factor matrix (left to right): 2GHz/1.7GHz OUTDOOR BASE STATION CONVERSION FACTOR; 800MHz OUTDOOR BASE STATION CONVERSION FACTOR; INDOOR BASE STATION CONVERSION FACTOR.

Rows of $Pop_{b}$ vector: 2GHz/1.7GHz OUTDOOR BASE STATION ESTIMATED NUMBER OF TERMINALS; 800MHz OUTDOOR BASE STATION ESTIMATED NUMBER OF TERMINALS; INDOOR BASE STATION ESTIMATED NUMBER OF TERMINALS.

$Pop_{a_i}$ : ESTIMATED NUMBER OF TERMINALS IN OUTPUT UNIT $a_i$ $Pop_{b_j}$ : ESTIMATED NUMBER OF TERMINALS IN AGGREGATION UNIT $b_j$ $k_{b_j \to a_i}$ : CONVERSION FACTOR FROM $b_j$ TO $a_i$

TERMINAL NUMBER ESTIMATION DEVICE AND TERMINAL NUMBER ESTIMATION METHOD

TECHNICAL FIELD

The present invention relates to a terminal number estimation device and a terminal number estimation method for estimating the number of terminals located in a certain area.

BACKGROUND ART

A mobile terminal performs location registration on a sector, which is the area of influence of an antenna of a base station. The number of terminals (population) of mobile terminals located in each sector has been estimated based on the number of mobile terminals whose locations are registered on the sector of each base station. For example, Patent Literature 1 discloses a technique to calculate the number of mobile phones in a specified area using a location registration DB of mobile phones.

CITATION LIST

Patent Literature

PTL 1: Japanese Unexamined Patent Application Publication No. 2003-122877

SUMMARY OF INVENTION

Technical Problem

However, due to the overlap of sectors or the reflection of radio waves, there is a case where location registration is made on an adjacent sector across the sector boundary. For example, even when a mobile terminal is actually located in the sector range of a sector A, location registration is made on a sector B that is in close proximity to the sector A in some cases. This is called remote sensing of radio waves. When the radio wave remote sensing occurs, the number of terminals in one sector is underestimated, and the number of terminals in another sector is overestimated. There is thus a problem that number of terminals in each sector that is estimated based on location registration has an error due to remote sensing of radio waves.

In light of the foregoing, in order to solve the above problem, an object of the present invention is to provide a terminal number estimation device and a terminal number estimation method capable of estimating the number of terminals located in a specified area more appropriately.

Solution to Problem

To solve the above problem, a terminal number estimation device according to the present invention includes an area information acquisition means for acquiring area information containing area identification information identifying a location area of a terminal and area range information about an area range indicating a geographical range of an area identified by the area identification information, an in-area terminal number acquisition means for acquiring a number of terminals located in an area identified by the area identification information, and a terminal number correction means for correcting the number of terminals acquired by the in-area terminal number acquisition means based on correspondence information containing the area identification information and location information indicating a location of the terminal and the area information acquired by the area information acquisition means.

Further, a terminal number estimation method according to the present invention is a terminal number estimation method performed by a terminal number estimation device, which includes an area information acquisition step of acquiring area information containing area identification information identifying a location area of a terminal and area range information about an area range indicating a geographical range of an area identified by the area identification information, an in-area terminal number acquisition step of acquiring a number of terminals located in an area identified by the area identification information, and a terminal number correction step of correcting the number of terminals acquired in the in-area terminal number acquisition step based on correspondence information containing the area identification information and location information indicating a location of the terminal and the area information acquired in the area information acquisition step.

According to the present invention, the correspondence information indicates that a terminal that is present in an actual location which is a position indicated by the location information has made location registration on a first location registration area, which is an area identified by the area identification information. Then, an actual location area to which the actual location belongs is determined based on the area information, and the number of terminals located in each area is corrected based on a difference between the actual location area and the first location registration area. For example, when the actual location area of the terminal is different from the first location registration area due to remote sensing of radio waves, it is possible to correct the number of terminals located in each area. It is thereby possible to estimate the number of terminals located in each area more accurately.

Further, to solve the above problem, it is preferred that the terminal number estimation device according to the present invention further includes a first location information acquisition means for acquiring first location information containing terminal identification information identifying the terminal and area identification information identifying a location area of the terminal, and a second location information acquisition means for acquiring second location information containing the terminal identification and location information indicating a location of the terminal, wherein the correspondence information contains at least one of first correspondence information generated by a correspondence information generation means for generating correspondence information based on the area identification information and the location information by using the first location information acquired by the first location information acquisition means and the second location information acquired by the second location information acquisition means, and second correspondence information acquired by an correspondence information acquisition means for acquiring correspondence information containing the terminal identification information identifying the terminal, the area identification information identifying a location area of the terminal, and the location information indicating a location of the terminal.

According to the above aspect, the first correspondence information is generated based on area identification information identifying a location area contained in the first location information and location information (coordinate information) indicating a location of the terminal contained in the second location information. Further, the second correspondence information containing the terminal identification information, the area identification information and the location information is acquired. Each correspondence information indicates that a terminal that is present in an actual location which is a position indicated by the location information has made location registration on a first location registration area, which is an area identified by the area identification information. Then, an actual location area to which the actual location belongs is determined based on the area information, and the number of terminals located in each area is corrected based on a difference between the actual location area and the first location registration area. For example, when the actual location area of the terminal is different from the first location registration area due to remote sensing of radio waves, it is possible to correct the number of terminals located in each area. It is thereby possible to estimate the number of terminals located in each area more accurately.

It is preferred that the first location information and the second location information are acquired by different positioning techniques and positioning timing. In this case, by generating the correspondence information by combining the location information acquired by different positioning techniques, the correspondence between the area identification information and the location information can be estimated.

Further, in the terminal number estimation device according to the present invention, it is preferred that the first location information further contains first time information indicating a time when the first location information is acquired, the second location information further contains second time information indicating a time when the second location information is acquired, and the correspondence information generation means extracts the first location information and the second location information having the same terminal identification information and having a time difference between a time indicated by the first time information and a time indicated by the second time information being a specified value or less, and generates correspondence information based on the area identification information of the extracted first location information and the location information of the extracted second location information.

As a time difference between a time indicated by the first time information and a time indicated by the second time information is smaller, the reliability of correspondence between the area identification information and the location information is higher. Accordingly, by extracting the first location information and the second location information having a time difference of a specified value or less and generating correspondence information based on the area identification information of the first location information and the location information of the second location information, the highly reliable correspondence information can be obtained. It is thereby possible to estimate the number of terminals more accurately.

Further, in the terminal number estimation device according to the present invention, it is preferred that the first location information further contains first time information indicating a time when the first location information is acquired, the second location information further contains second time information indicating a time when the second location information is acquired, and the correspondence information generation means extracts the second location information having the same terminal identification information as one first location information, the second location information being a specified number of second location information containing the second time information indicating a time earlier than a time indicated by the first time information contained in the one first time information and a specified number of second location information containing the second time information indicating a time later than a time indicated by the first time information contained in the one first time information, estimates location information indicating a location of a terminal at the time indicated by the first time information contained in the one first location information based on the second time information and the location information contained in each of the extracted second location information and the first time information contained in the one first location information, and generates correspondence information based on the estimated location information of the terminal and the area identification information of the one first location information.

The second location information that contain the second time information indicating the times before and after the time indicated by the first time information contained in the first location information are extracted. Then, the location of the terminal at the time indicated by the first time information contained in the first location information is estimated using the extracted second location information, thereby grasping the location of the terminal when the first location information is acquired more accurately. By generating the correspondence information using the location information indicating the location of the terminal obtained in this manner, it is possible to estimate the number of terminals more accurately.

Further, in the terminal number estimation device according to the present invention, it is preferred that, when first observation target information containing at least one of observation target period information indicating a period to be observed and observation area information indicating an area to be observed is input from outside, the first location information acquisition means acquires the first location information based on the first observation target information, and when second observation target information containing at least one of observation target period information indicating a period to be observed and observation range information indicating a geographical range to be observed is input from outside, the second location information acquisition means acquires the second location information based on the second observation target information.

By the input of the observation target period and the observation target area, the correspondence information in a desired time range or geographical range can be generated. It is thereby possible to reduce the load to generate the correspondence information.

Further, the terminal number estimation device according to the present invention may further include an area range estimation means for estimating an area range of an area identified by the area identification information based on the correspondence information, and the area information acquisition means preferably acquires area range information indicating the area range estimated by the area range estimation means and area identification information of the area as the area information.

The area range estimated by Voronoi tessellation or the like is sometimes different from an actual area range due to the depression angle of an antenna, the presence and absence of an obstacle and the like. On the other hand, the actual location indicated by the location information of the correspondence information can be considered to be included in the first location registration area that is identified by the area identification information of the correspondence information. Thus, by estimating the area range based on the correspondence information, it is possible to reflect the relationship of the acquired area identification information and the location information on the estimation of the area range of an area identified by the area identification information, which allows more appropriate estimation of the area range. It is thereby possible to estimate the number of terminals based on the more appropriate area range, and it is thereby possible to estimate the number of terminals located in each area more accurately.

Further, in the terminal number estimation device according to the present invention, it is preferred that the terminal number correction means extracts a plurality of correspondence information having the same area identification information, determines actual location areas being areas to which locations indicated by the location information of the plurality of extracted correspondence information belong, calculates a proportion of the number of correspondence information in each of the actual location areas to a total number of the plurality of extracted correspondence information as a correction factor, and corrects the number of terminals using the correction factor.

The number of correspondence information having the same area identification information indicates the number of terminals that have made location registration on the area identified by the area identification information. Further, the number of correspondence information in each actual location area among the correspondence information having the same area identification information indicates the number of terminals that have been actually located in each area among the number of terminals that have made location registration on the area identified by the area identification information. Then, the number of terminals located in each area is corrected by using the proportion of the number of correspondence information in each actual location area to the total number of correspondence information having the same area identification information as the correction factor. For example, even when the area identified by the area identification information and the actual location area are different due to remote sensing of radio waves, the number of terminals located in each area can be corrected. It is thereby possible to estimate the number of terminals located in each area more accurately.

Further, in the terminal number estimation device according to the present invention, it is preferred that the terminal number correction means calculates a first proportion being a proportion of the number of correspondence information in each area, calculates a second proportion being a proportion of the number of terminals in each area by estimating the number of terminals whose location is registered for each area, calculates an adjustment factor of the same area based on the first proportion and the second proportion of the same area, and adjusts the correction factor based on the adjustment factor.

Although the second location information is necessary for the generation of the correspondence information, there is a case where the second location information cannot be acquired because of a GPS blind area. In such a case, the correspondence information corresponding to the second location information that has not been acquired is not generated. On the other hand, the second location information on an area is not affected by the GPS blind area. Thus, the adjustment factor of each area is calculated based on the second proportion of the number of terminals whose location is registered for each area and the proportion of the number of correspondence information in each area, and the correction factor is thereby adjusted. It is thereby possible to adjust the correction factor by taking the correspondence information that has not been generated due to the GPS blind area into consideration. It is thus possible to estimate the number of terminals with the GPS blind area into consideration, and it is thereby possible to estimate the number of terminals located in each area more accurately.

Further, it is preferred that the terminal number estimation device according to the present invention further includes a population estimation means for estimating a population of one user attribute based on the number of terminals corrected by the terminal number correction means and a ratio of the number of in-area terminals having the one user attribute in a predetermined wide area and a population of the one user attribute included in the wide area based on statistical data.

In this case, the population of one user attribute can be estimated more accurately.

Further, a terminal number estimation device according to the present invention includes a first location information acquisition means for acquiring first location information containing terminal identification information identifying a terminal and area identification information identifying a location area of the terminal, a second location information acquisition means for acquiring second location information containing the terminal identification and location information indicating a location of the terminal, a correspondence information generation means for generating correspondence information based on the area identification information and the location information by using the first location information acquired by the first location information acquisition means and the second location information acquired by the second location information acquisition means, an area information acquisition means for acquiring area information containing the area identification information and area range information about an area range indicating a geographical range of an area identified by the area identification information, an in-area terminal number acquisition means for acquiring a number of terminals located in an area identified by the area identification information, and a terminal number correction means for correcting the number of terminals acquired by the in-area terminal number acquisition means based on the correspondence information generated by the correspondence information generation means and the area information acquired by the area information acquisition means.

Further, a terminal number estimation method according to the present invention includes a first location information acquisition step of acquiring first location information containing terminal identification information identifying a terminal and area identification information identifying a location area of the terminal, a second location information acquisition step of acquiring second location information containing the terminal identification and location information indicating a location of the terminal, a correspondence information generation step of generating correspondence information based on the area identification information and the location information by using the first location information acquired in the first location information acquisition step and the second location information acquired in the second location information acquisition step, an area information acquisition step of acquiring area information containing the area identification information and area range information about an area range indicating a geographical range of an area identified by the area identification information, an in-area terminal number acquisition step of acquiring a number of terminals located in an area identified by the area identification information, and a terminal number correction step of correcting the number of terminals acquired in the in-area terminal number acquisition step based on the correspondence information generated in the correspondence information generation step and the area information acquired in the area information acquisition step.

According to the present invention, the first correspondence information is generated based on area identification information identifying a location area contained in the first location information and location information (coordinate information) indicating a location of the terminal contained in the second location information. Further, the second correspondence information containing the terminal identification information, the area identification information and the location information is acquired. Each correspondence information indicates that a terminal that is present in an actual location which is a position indicated by the location information has made location registration on a first location registration area, which is an area identified by the area identification information. Then, an actual location area to which the actual location belongs is determined based on the area information, and the number of terminals located in each area is corrected based on a difference between the actual location area and the first location registration area. For example, when the actual location area of the terminal is different from the first location registration area due to remote sensing of radio waves, it is possible to correct the number of terminals located in each area. As a result, the number of terminals located in each area can be estimated with high accuracy.

Advantageous Effects of Invention

According to the present invention, it is possible to estimate the number of terminals located in a specified area more appropriately.

BRIEF DESCRIPTION OF DRAWINGS

FIG. 3 is a view showing an example of a first location information management table included in a first location information acquisition unit.

FIG. 4 is a view showing an example of a second location information management table included in a second location information acquisition unit.

FIG. 5 is a view showing an example of a correspondence information management table included in a correspondence information generation unit.

FIG. 17 is a view showing GPS information with area information.

FIG. 18 is a view showing correspondence information.

FIG. 26 is a view to describe a conversion process of the number of terminals according to a seventh embodiment.

FIG. 27 is a view showing a determinant for conversion to the estimated number of terminals in a target output unit.

DESCRIPTION OF EMBODIMENTS

Figure 1:
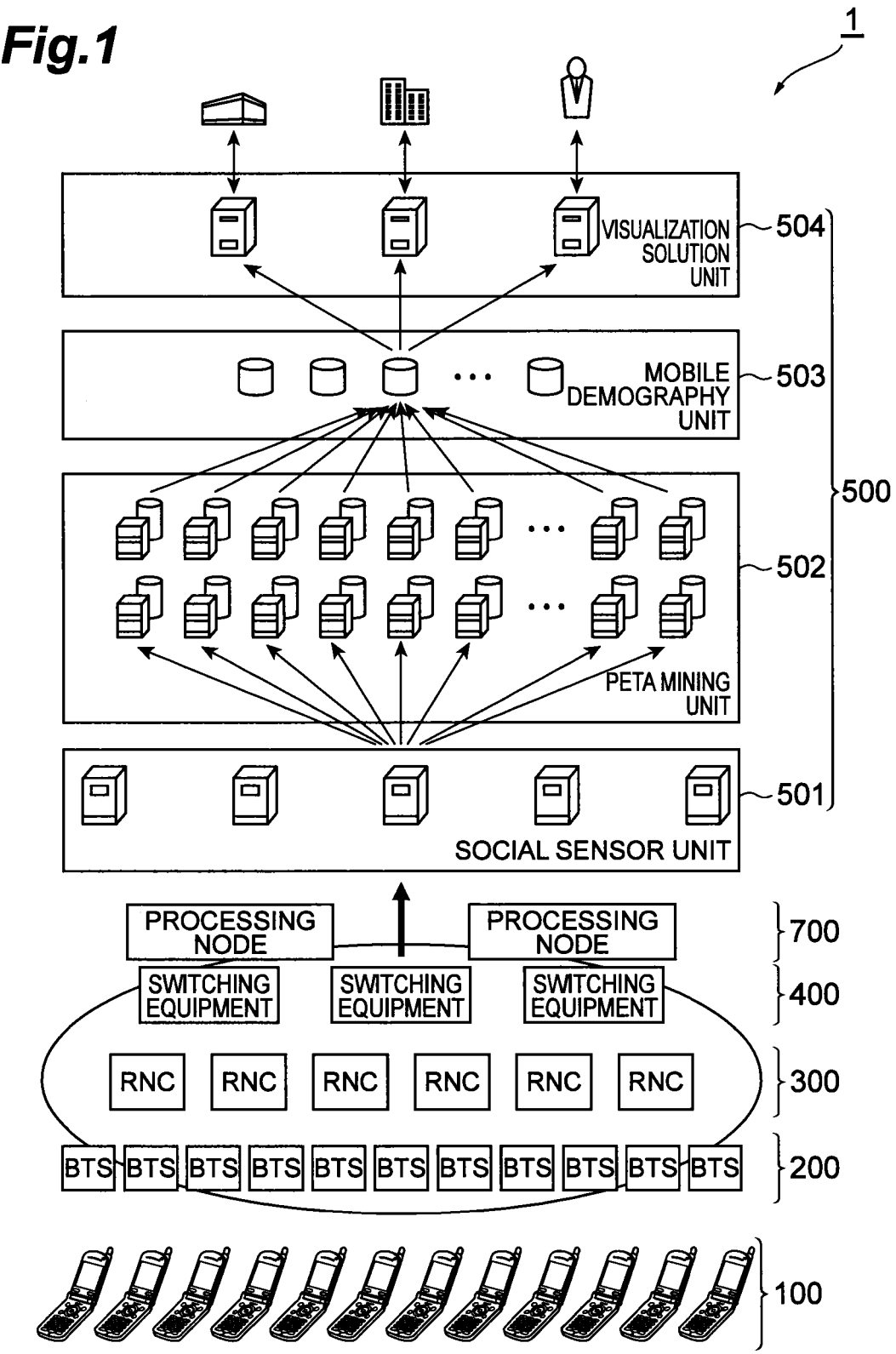
FIG. 1 is a system configuration diagram of a communication system according to first to third embodiments.

Preferred embodiments of a terminal number estimation device and a terminal number estimation method according to the present invention are described hereinafter in detail with reference to the drawings. Note that, in the following description, the same or equivalent elements are denoted by the same reference numerals and repeated explanation thereof is omitted.

First Embodiment

FIG. 1 is a system configuration diagram of a communication system 1 according to a first embodiment. As shown in FIG. 1, the communication system 1 according to the first embodiment includes a mobile terminal (which is a mobile phone, for example, and equivalent to "terminal" in CLAIMS) 100, a BTS (Base Transceiver Station) 200, an RNC (Radio Network Controller) 300, a switching equipment 400, various types of processing nodes 700, and a control center 500. Further, the control center 500 includes a social sensor unit 501, a peta mining unit 502, a mobile demography unit 503, and a visualization solution unit 504.

The switching equipment 400 collects first location information and second location information, which are described later, for the mobile terminal 100 through the BTS 200 and the RNC 300. The switching equipment 400 stores the collected first location information and second location information and outputs the collected first location information and second location information to the control center 500 at predetermined timing or in response to a request from the control center 500.

The various types of processing nodes 700 acquire the first location information and the second location information of the mobile terminal 100 through the RNC 300 and the switching equipment 400 and, in some cases, performs recalculation of the location or the like, and outputs the collected location information to the control center 500 at predetermined timing or in response to a request from the control center 500.

The mobile terminal 100 transmits the first location information at first intervals (for example, at intervals of 54 minutes). The first location information is location registration information, for example, and accumulated in the social sensor unit 501, which is described later, through the BTS 200, the RNC 300 and the switching equipment 400. The first location information contains a terminal ID (which is equivalent to "terminal identification information" in CLAIMS) that can identify the mobile terminal 100 and an area ID (which is equivalent to "area identification information" in CLAIMS) that can identify a first location registration area which is an area where the mobile terminal 100 is located. The first location information may further contain first time information, which is described later. Note that the area is a sector, which is the area of influence of an antenna of the BTS 200, for example. Further, the mobile terminal 100 may transmit the first location information not only at first intervals but also at other timing (for example, at the time of moving across an area, at the time of transmission etc.).

Further, some of the mobile terminals 100 transmit the second location information at second intervals (for example, at intervals of 5 minutes) that is shorter than the above-described first intervals. The second location information is GPS information, for example, and accumulated in the social sensor unit 501, which is described later, through the BTS 200, the RNC 300 and the switching equipment 400. However, if the second location information of the mobile terminal 100 is GPS information, the various type of processing nodes 700 can acquire the GPS information of the mobile terminal 100 without through the RNC 300 and the switching equipment 400. The acquisition of the GPS information is described later. The second location information contains a terminal ID that can identify the mobile terminal 100 and coordinate information (which is equivalent to "location information" in CLAIMS) indicating the latitude and longitude of the mobile terminal 100.

The latitude and longitude of the mobile terminal 100 are acquired using the function (GPS etc.) incorporated in the mobile terminal 100. The second location information may further contain second time information, which is described later. Note that the mobile terminal 100 may transmit the second location information not only at second intervals but also at other timing (for example, at the time of using a service with GPS information, at the time when an inquiry about GPS information is made by a user etc.).

As for the collection of GPS information, a GPS information collection unit, which is not shown, included in the social sensor unit 501 or the mobile demography unit 503 collects longitude information and latitude information indicating the location of each mobile terminal 100 transmitted from each mobile terminal 100. Note that the GPS information collection unit may accumulate the collected longitude information and latitude information of the mobile terminal 100 together with a user identifier of the mobile terminal 100 and positioning time information as GPS information into a GPS information accumulation unit, which is not shown, included in the peta mining unit 502, for example.

The social sensor unit 501 is a server device that accumulates data containing the first location information and the second location information of the mobile equipment 100 and the like. The social sensor unit 501 acquires and accumulates data in response to a data reception request from the switching equipment 400 or by transmitting a data transmission request to the switching equipment 400.

The peta mining unit 502 is a server device that converts the data received from the social sensor unit 501 into a predetermined data format. For example, the peta mining unit 502 performs sorting using an identifier as a key or sorting by area. The terminal number estimation device 10 according to this embodiment is constructed in the peta mining unit 502, for example, and calculates the number of terminals corresponding to a terminal number estimation target (which is a terminal number estimation target area and a time period in this example).

The mobile demography unit 503 is a server device that performs aggregation and statistics analysis processing and space analysis processing of the data processed in the peta mining unit 502.

The visualization solution unit 504 is a server device that processes the data aggregated in the mobile demography unit 503 into visible. For example, the visualization solution unit 504 can map the aggregated data onto a map. Note that the data processed in the visualization solution unit 504 is provided to corporations, government and other public offices or individuals and used for retail development, road traffic survey, disaster risk management, environmental protection and the like. Note that the statistically processed information is processed so as not to identify individuals as a matter of course.

It should be noted that the social sensor unit 501, the peta mining unit 502, the mobile demography unit 503 and the visualization solution unit 504 are server devices as described above, and they have a basic configuration of a typical information processing device (specifically, CPU, RAM, ROM, an input device such as a keyboard and a mouse, a communication device that performs communication with the outside, a storage device that stores information, an output device such as a display and a printer) as a matter of course, though not shown.

Figure 2:
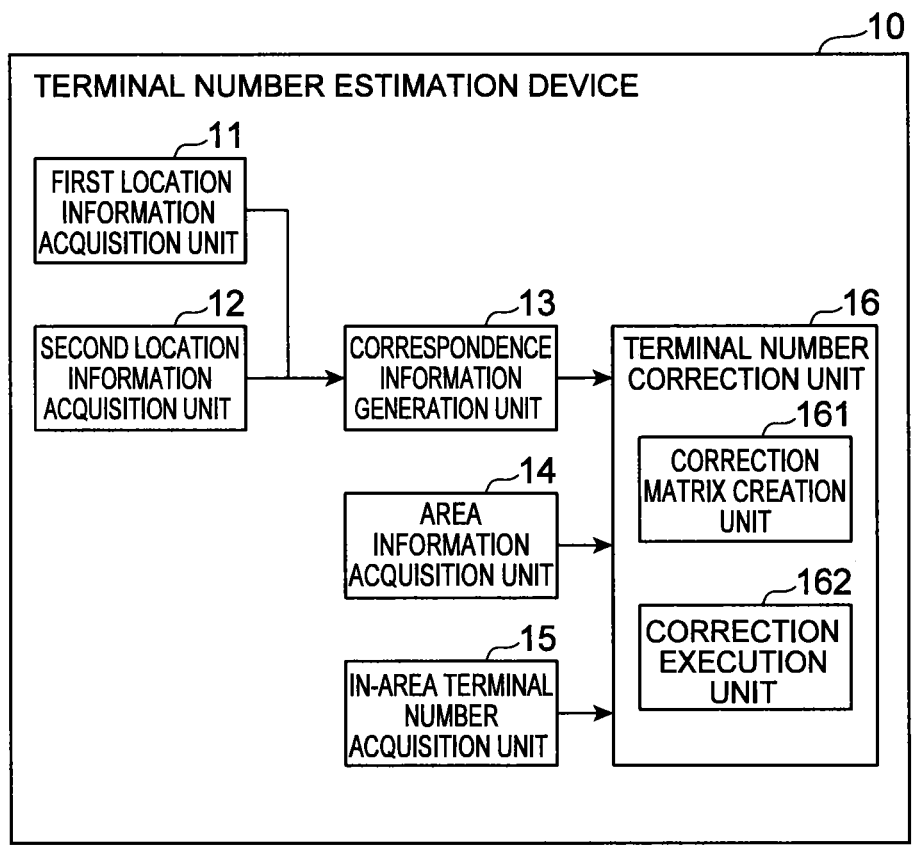
FIG. 2 is a block diagram showing a functional configuration of a terminal number estimation device according to a first embodiment.

The functions of the terminal number estimation device 10 are described hereinafter. FIG. 2 is a block diagram showing a functional configuration of the terminal number estimation device 10. As shown in FIG. 2, the terminal number estimation device 10 includes a first location information acquisition unit 11 (which is equivalent to "first location information acquisition means" in CLAIMS), a second location information acquisition unit 12 (which is equivalent to "second location information acquisition means" in CLAIMS), a correspondence information generation unit 13 (which is equivalent to "correspondence information generation means" in CLAIMS), an area information acquisition unit 14 (which is equivalent to "area information acquisition means" in CLAIMS), an in-area terminal number acquisition unit 15 (which is equivalent to "in-area terminal number acquisition means" in CLAIMS), and a terminal number correction unit 16 (which is equivalent to "terminal number correction means" in CLAIMS).

The first location information acquisition unit 11 functions as a first location information acquisition means that acquires the first location information containing a terminal ID and an area ID. The first location information containing a terminal ID and an area ID is acquired by an external device (for example, any unit of the control center 500) of the terminal number estimation device 10 and accumulated in a first accumulation unit, which is not shown. The first accumulation unit may be included in the terminal number estimation device 10 or placed outside the terminal number estimation device 10. The first location information acquisition unit 11 acquires the first location information from the first accumulation unit and manages the information by storing it into a first location information management table.

The first location information may contain first time information indicating the time when the first location information is acquired. The first time information may be the time when any unit of the control center 500 has acquired the first location information, for example. Further, the first time information may be information indicating the time related to transmission and reception of the first location information, such as the time when the mobile terminal 100 has transmitted the first location information, and the time given in any device of the communication system 1 may be used. Note that, when first observation target information containing at least one of observation target period information containing a set of the start time and the end time for grasping the state of stay and observation area information is input from the outside, the first location information acquisition unit 11 may acquire the first location information in the observation target period and the observation area of the input first observation target information. The observation area information is given as an area ID, a geographical range (for example, municipalities) or the like. Further, the first location information acquisition unit 11 may acquire the first location information on a regular basis.

FIG. 3 is a view showing an example of the first location information management table. The first location information management table contains the first location information associating a terminal ID, first time information, and an area ID. The terminal ID is identification information for identifying the mobile terminal 100 that has transmitted the first location information as described above. The first time information indicates the time when the first location information is acquired as described above. The area ID is identification information for identifying the first location registration area where the mobile terminal 100 that has transmitted the first location information has been located at the time of transmitting the first location information as described above.

The second location information acquisition unit 12 functions as a second location information acquisition means that acquires the second location information containing a terminal ID and coordinate information. The second location information containing a terminal ID and coordinate information is acquired by an external device (for example, any unit of the control center 500) of the terminal number estimation device 10 and accumulated in a second accumulation unit, which is not shown. The second accumulation unit may be the above-described GPS information accumulation unit, for example, and included in the terminal number estimation device 10 or placed outside the terminal number estimation device 10. The second location information acquisition unit 12 acquires the second location information from the second accumulation unit and manages the information by storing it into a second location information management table.

The second location information may contain second time information indicating the time when the second location information is acquired. The second time information may be the time when any unit of the control center 500 has acquired the second location information, for example. Further, the second time information may be information indicating the time related to transmission and reception of the second location information, such as the time when the mobile terminal 100 has transmitted the second location information, and the time given in any device of the communication system 1 may be used. Note that, when second observation target information containing at least one of observation target period information containing a set of the start time and the end time for grasping the state of stay and observation range information is input from the outside, the second location information acquisition unit 12 may acquire the second location information in the observation target period and the observation range of the input second observation target information. The observation area information is given as latitude and longitude, a geographical range (for example, municipalities) or the like. Further, the second location information acquisition unit 12 may acquire the second location information on a regular basis.

FIG. 4 is a view showing an example of the second location information management table. The second location information management table contains the second location information associating a terminal ID, second time information, and coordinate information. The terminal ID is identification information for identifying the mobile terminal 100 that has transmitted the second location information as described above. The second time information indicates the time when the second location information is acquired as described above. The coordinate information indicates the coordinates of a location where the mobile terminal 100 that has transmitted the second location information has been located at the time of transmitting the second location information as described above.

The correspondence information generation unit 13 functions as a correspondence information generation means that generates correspondence information based on the area ID and the coordinate information using the first location information acquired by the first location information acquisition unit 11 and the second location information acquired by the second location information acquisition unit 12. To be more specific, the correspondence information generation unit 13 extracts the first location information and the second location information having the same terminal ID from the first location information stored in the first location information management table and the second location information stored in the second location information management table.

The correspondence information generation unit 13 then calculates a time difference between the time indicated by the first time information contained in the first location information and the time indicated by the second time information contained in the second location information. The correspondence information generation unit 13 determines whether the calculated time difference is within a predetermined specified value (for example, 5 minutes). When the time difference is within the specified value, the correspondence information generation unit 13 generates correspondence information associating the area ID contained in the first location information, the coordinate information contained in the second location information, and time difference information indicating the calculated time difference and stores the correspondence information into the correspondence information management table. In this manner, the correspondence between the area ID and the coordinate information is estimated based on the first location information and the second location information acquired by different positioning methods and positioning timing, and the correspondence information associating the area ID and the coordinate information is generated.

FIG. 5 is a view showing an example of the correspondence information management table. The correspondence information management table contains the correspondence information associating the area ID, the coordinate information and the time difference information. The area ID is information acquired from the first location information as described above. The coordinate information is information acquired from the second location information as described above. The time difference information is information indicating a time difference between the time indicated by the first time information associated with the area ID and the time indicated by the second time information associated with the coordinate information. Further, the correspondence information generation unit 13 may acquire the time when the correspondence information is generated and add third time information indicating that time to the correspondence information.

A generation process of the correspondence information is specifically described hereinafter using the first location information management table in FIG. 3 and the second location information management table in FIG. 4. The correspondence information generation unit 13 extracts first location information D2 and second location information E2 both having the terminal ID "2" from the first location information management table in FIG. 3 and the second location information management table in FIG. 4. Then, the correspondence information generation unit 13 calculates a time difference between the time "2010/12/11 8:20" indicated by the first time information of the first location information D2 and the time "2010/12/11 8:22" indicated by the second time information of the second location information E2. In this case, because the time difference is 2 minutes, the correspondence information generation unit 13 generates correspondence information M2 associating the area ID "B" of the first location information D2, the coordinate information "(x2,y2)" of the second location information E2 and the time difference "0:02" and stores it into the correspondence information management table in FIG. 5.

On the other hand, the correspondence information generation unit 13 extracts first location information D1, first location information D3, second location information E1 and second location information E4 all having the terminal ID "1" from the first location information management table in FIG. 3 and the second location information management table in FIG. 4. Then, the correspondence information generation unit 13 calculates each time difference between the time "2010/12/11 8:20" indicated by the first time information of the first location information D1, the time "2010/12/11 8:20" indicated by the second time information of the second location information E1, and the time "2010/12/11 9:30" indicated by the second time information of the second location information E4. Because there is no time difference between the time indicated by the first time information of the first location information D1 and the time indicated by the second time information of the second location information E1, the correspondence information generation unit 13 stores correspondence information M1 associating the area ID "A" of the first location information D1, the coordinate information "(x1, y1)" of the second location information E1 and the time difference "0:00" into the correspondence information management table in FIG. 5.

Further, because a time difference between the time indicated by the first time information of the first location information D1 and the time indicated by the second time information of the second location information E4 is 70 minutes, the correspondence information generation unit 13 does not generate the correspondence information. Likewise, the correspondence information generation unit 13 calculates each time difference between the time "2010/12/11 8:50" indicated by the first time information of the first location information D3, the time "2010/12/11 8:20" indicated by the second time information of the second location information E1, and the time "2010/12/11 9:30" indicated by the second time information of the second location information E4. Because a time difference between the time indicated by the first time information of the first location information D3 and the time indicated by the second time information of the second location information E1 is 30 minutes, and a time difference between the time indicated by the first time information of the first location information D3 and the time indicated by the second time information of the second location information E4 is 40 minutes, the correspondence information generation unit 13 does not generate the correspondence information.

When there are a plurality of the second location information containing the second time information indicating the time whose time difference from the time indicated by the first time information of the first location information is within a specified value, the correspondence information generation unit 13 may generate the correspondence information for each of them or generate the correspondence information based on the second location information containing the second time information indicating the time with the smallest time difference.

The area information acquisition unit 14 functions as an area information acquisition means that acquires area information containing an area ID and area range information related to an area range indicating a geographical range of an area identified by the area ID. The area information acquisition unit 14 acquires the area information from an external server device, for example. The area information may be stored in any unit of the control center 500, and the area information acquisition unit 14 may acquire the area information from the unit. The geographical range is a range defined by coordinates or the like.

The in-area terminal number acquisition unit 15 functions as an in-area terminal number acquisition means that acquires the number of the mobile terminals 100 located in an area identified by the area ID. The in-area terminal number acquisition unit 15 acquires the number of terminals estimated in an external server device, for example. The number of terminals may be estimated in any unit of the control center 500, and the in-area terminal number acquisition unit 15 may acquire the number of terminals from the unit.

The in-area terminal number acquisition unit 15 acquires the number of the mobile terminals 100 located at least in an area to be estimated and an area near that area. The area near a specified area is an area where remote sensing of radio waves is likely to occur when registration of the first location information on the specified area is performed. The nearby area may be predetermined for each area in the terminal number estimation device 10.

The terminal number correction unit 16 functions as a terminal number correction means that corrects the number of terminals acquired by the in-area terminal number acquisition unit 15 based on the correspondence information generated by the correspondence information generation unit 13 and the area information acquired by the area information acquisition unit 14. The terminal number correction unit 16 includes a correction matrix creation unit 161 and a correction execution unit 162.

The correction matrix creation unit 161 functions as a correction matrix creation means that creates a correction matrix for correcting the number of terminals acquired by the in-area terminal number acquisition unit 15. To be more specific, the correction matrix creation unit 161 extracts the correspondence information having the same area ID among the correspondence information stored in the correspondence information management table. The correction matrix creation unit 161 then determines an actual location area for the extracted correspondence information based on the area information acquired by the area information acquisition unit 14. The correction matrix creation unit 161 then calculates the number of correspondence information for each actual location area. Note that the actual location area is an area to which the coordinate position indicated by the coordinate information of the correspondence information belongs. In other words, the actual location area is an area where the mobile terminal 100 has been actually located at the time of transmitting the second location information.

The correction matrix creation unit 161 calculates an actual location area ratio, which is the ratio of the number of correspondence information having the same area ID in each actual location area. Then, the correction matrix creation unit 161 calculates the proportion of the number of correspondence information in each actual location area based on the calculated actual location area ratio, and uses it as a correction vector (which is equivalent to "correction factor" in CLAIMS). Specifically, the correction matrix creation unit 161 determines in which area the mobile terminal 100 that has transmitted the first location information of a certain area has been actually located, calculates the proportion of the number of mobile terminals 100 that have transmitted the first location information of a certain area with respect to each actual location area, and uses it as the correction vector.

Specifically, the correction matrix creation unit 161 creates a correction vector a=[(the number of correspondence information whose area ID is A and actual location area is an area A)/(the number of correspondence information whose area ID is A), (the number of correspondence information whose area ID is A and actual location area is an area B)/(the number of correspondence information whose area ID is A), (the number of correspondence information whose area ID is A and actual location area is an area C)/(the number of correspondence information whose area ID is A), . . . ], a correction vector b="[(the number of correspondence information whose area ID is B and actual location area is an area A)/(the number of correspondence information whose area ID is B), (the number of correspondence information whose area ID is B and actual location area is an area B)/(the number of correspondence information whose area ID is B), (the number of correspondence information whose area ID is B and actual location area is an area C)/(the number of correspondence information whose area ID is B), . . . ] and the like. Then, the correction matrix creation unit 161 creates a correction matrix M by arranging the correction vectors of the respective areas with transposition based on the following equation (1).

$$\text{Correction matrix } M=[a^T, b^T, c^T, \ldots ] \quad (1)$$

Figure 6:
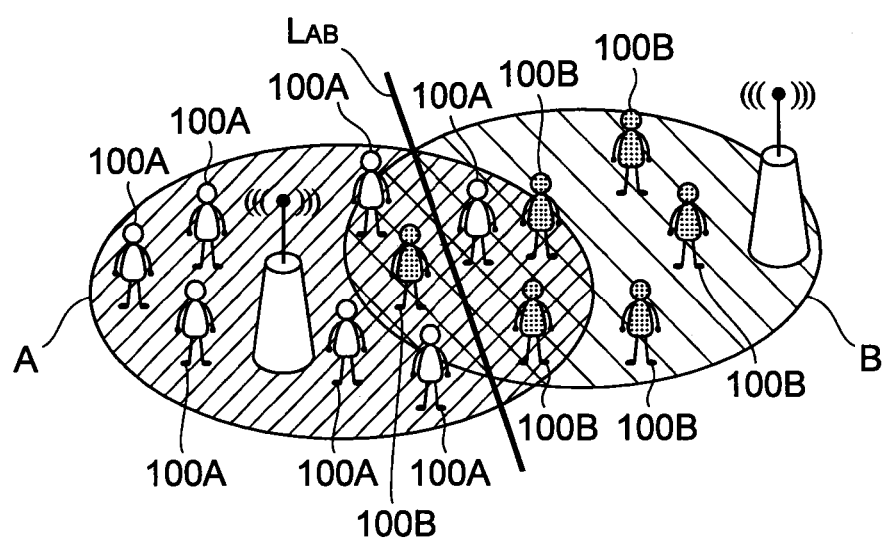
FIG. 6 is a view showing an example of a location of a mobile terminal having transmitted first location information.

FIG. 6 is a view showing an example of locations of the mobile terminals 100 that have transmitted the first location information. In the example shown in FIG. 6, a plurality of mobile terminals 100A that have transmitted the first location information of the area A and a plurality of mobile terminals 100B that have transmitted the first location information of the area B are respectively present in specified locations. Further, a border LAB is a border between the area A and the area B that is determined based on the area information acquired by the area information acquisition unit 14.

The correction matrix creation unit 161 calculates the proportion of the number of mobile terminals 100A in each actual location area to the total number of mobile terminals 100A that have transmitted the first location information of the area A. Specifically, the correction matrix creation unit 161 reads the correspondence information whose area ID is A among the correspondence information stored in the correspondence information management table. Then, the correction matrix creation unit 161 determines an area (actual location area) to which the coordinate position indicated by the coordinate information of the read correspondence information belongs based on the area information acquired by the area information acquisition unit 14. The correction matrix creation unit 161 then calculates the number of correspondence information in each actual location area and calculates the proportion of the number of correspondence information in each actual location area to the number of the read correspondence information.

In the example of FIG. 6, in the correspondence information stored in the correspondence information management table, among the total number 7 of correspondence information whose area ID is A, the number of correspondence information whose actual location area is A is 6, and the number of correspondence information whose actual location area is B is 1. Thus, the correction matrix creation unit 161 creates the correction vector a=[6/7, 1/7] of the area A. Likewise, the correction matrix creation unit 161 calculates the number of correspondence information in each actual location area among the total number 6 of correspondence information whose area ID is B in the correspondence information stored in the correspondence information management table. As a result, the correction matrix creation unit 161 creates the correction vector b=[1/6, 5/6] of the area B.

After creating the correction vector of each area, the correction matrix creation unit 161 creates the correction matrix M according to the above equation (1). In the example shown in FIG. 6, the correction matrix creation unit 161 creates the correction matrix M=[$a^T, b^T$].

$$\text{Correction matrix } M = \begin{pmatrix} 6/7 & 1/6 \\ 1/7 & 5/6 \end{pmatrix}$$

The correction execution unit 162 functions as a correction execution means that executes correction of the number of terminals acquired by the in-area terminal number acquisition unit 15 by using the correction matrix M created by the correction matrix creation unit 161. The correction execution unit 162 calculates a corrected terminal number E by the following equation (2), where n is a terminal number vector indicating the number of terminals in each area.

$$\text{Corrected terminal number } E = M \times n^T \quad (2)$$

This is specifically described using the example shown in FIG. 6. Assume that the number of terminals nA in the area A acquired by the in-area terminal number acquisition unit 15 is 210, and the number of terminals nB in the area B is 120. Thus, the terminal number vector n=[$n_A, n_B$]=[210,120]. The correction execution unit 162 calculates the corrected terminal number E based on the above equation (2). As a result, the number of terminals in the area A after correction is 200, and the number of terminals in the area B after correction is 130.

$$\text{Corrected terminal number } E = M \times n^T = \begin{pmatrix} 6/7 & 1/6 \\ 1/7 & 5/6 \end{pmatrix} \begin{pmatrix} 210 \\ 120 \end{pmatrix} = \begin{pmatrix} 200 \\ 130 \end{pmatrix}$$

Figure 7:
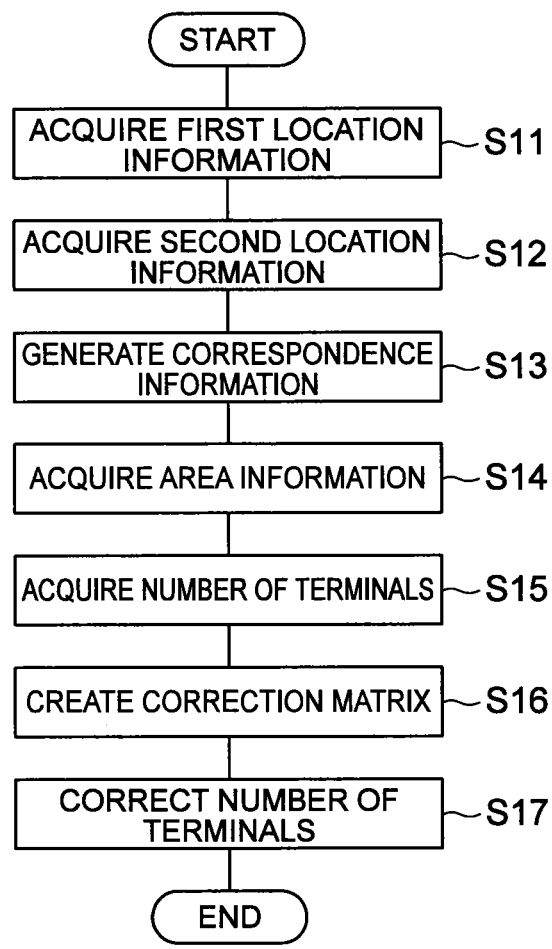
FIG. 7 is a flowchart showing a terminal number estimation process of the terminal number estimation device according to the first embodiment.

The operation of the terminal number estimation device 10 is described hereinafter with reference to FIG. 7. FIG. 7 is a flowchart showing a terminal number estimation process of the terminal number estimation device 10.

First, the first location information acquisition unit 11 acquires the first location information and stores it into the first location information management table (S11, first location information acquisition step). Further, the second location information acquisition unit 12 acquires the second location information and stores it into the second location information management table (S12, second location information acquisition step).

Next, the correspondence information generation unit 13 extracts the first location information acquired by the first location information acquisition unit 11 and the second location information acquired by the second location information acquisition unit 12 having the same terminal ID. The correspondence information generation unit 13 then calculates a time difference between the time indicated by the first time information contained in the extracted first location information and the time indicated by the second time information contained in the extracted second location information. When the time difference is within a specified value, the correspondence information generation unit 13 generates the correspondence information associating the area ID contained in the first location information, the coordinate information contained in the second location information and the calculated time difference, and stores it into the correspondence information management table (S13, correspondence information generation step).

Further, the area information acquisition unit 14 acquires the area information associating the area ID and the area range information (S14, area information acquisition step). The in-area terminal number acquisition unit 15 acquires the number of mobile terminals 100 located in an area identified by the area ID as a target of estimation and in an area near that area (S15, in-area terminal number acquisition step). Then, the correction matrix creation unit 161 of the terminal number correction unit 16 calculates, for the correspondence information having the same area ID, the number of correspondence information in each actual location area based on the correspondence information generated by the correspondence information generation unit 13 and the area information acquired by the area information acquisition unit 14.

Then, the correction matrix creation unit 161 calculates the proportion of the number of correspondence information in each actual location area to the total number of correspondence information having the same area ID and thereby creates a correction vector. The correction matrix creation unit 161 then creates the correction matrix M using the correction vector of each area based on the above-described equation (1) (S16, terminal number correction step). The correction execution unit 162 corrects the number of terminals acquired by the in-area terminal number acquisition unit 15 by using the correction matrix M created by the correction matrix creation unit 161 based on the above-described equation (2) (S17, terminal number correction step).

Effects of the terminal number estimation device 10 are described hereinafter. In the terminal number estimation device 10, the first location information acquisition unit 11 acquires the first location information containing the terminal ID that identifies the mobile terminal 100 and the area ID that identifies the located area of the mobile terminal 100. Further, the second location information acquisition unit 12 acquires the second location information containing the terminal ID and the coordinate information indicating the location of the mobile terminal 100. Then, the correspondence information generation unit 13 generates the correspondence information based on the area ID and the coordinate information by using the first location information acquired by the first location information acquisition unit 11 and the second location information acquired by the second location information acquisition unit 12. Further, the area information acquisition unit 14 acquires the area information containing the area ID and the area range indicating the geographical range of the area identified by the area ID, and the in-area terminal number acquisition unit 15 acquires the number of mobile terminals located in the area identified by the area ID. Then, the terminal number correction unit 16 corrects the number of terminals acquired by the in-area terminal number acquisition unit 15 based on the correspondence information generated by the correspondence information generation unit 13 and the area information acquired by the area information acquisition unit 14.

Thus, when the actual location area which is an area to which the location where the mobile terminal 100 has been present belongs is different from the area identified by the area ID due to remote sensing of radio waves, for example, it is possible to correct the number of mobile terminals 100 located in each area. As a result, it is possible to estimate the number of mobile terminals 100 located in each area more accurately.

Further, the first location information may contain the first time information indicating the time when the first location information is acquired, and the second location information may contain the second time information indicating the time when the second location information is acquired. Then, in the terminal number estimation device 10, the correspondence information generation unit 13 extracts the first location information and the second location information having the same terminal ID and having a time difference between the time indicated by the first time information and the time indicated by the second time information that is within a specified value, and generates the correspondence information based on the area ID of the extracted first location information and the coordinate information of the extracted second location information. It is thereby possible to obtain the highly reliable correspondence information.

Further, in the terminal number estimation device 10, when the first observation target information containing at least one of the observation target period information indicating a period to be observed and the observation area information indicating an area to be observed is input from the outside, the first location information acquisition unit 11 may acquire the first location information based on the first observation target information. Likewise, when the second observation target information containing at least one of the observation target period information indicating a period to be observed and the observation range information indicating a geographical range (for example, coordinate range) to be observed is input from the outside, the second location information acquisition unit 12 may acquire the second location information based on the second observation target information.

Note that, even when one of the first observation target information and the second observation target information is input, not only when both of them are input from the outside, the first location information acquisition unit 11 and the second location information acquisition unit 12 can acquire the first location information and the second location information, respectively. For example, when the first observation target information is input, the second location information acquisition unit 12 converts an area indicated by the observation area information of the first observation target information into the observation range information based on area range information about the area range of an area indicated by the area ID. Then, the second location information acquisition unit 12 acquires the second location information included in the geographical range.

On the other hand, when the second observation target information is input, the first location information acquisition unit 11 converts the geographical range indicated by the observation range information of the second observation target information into the observation area information based on area range information about the area range of an area indicated by the area ID. Then, the first location information acquisition unit 11 acquires the first location information of the area indicated by the observation area information.

As described above, upon input of at least one of the first observation target information and the second observation target information, it is possible to generate the correspondence information in a desired time range or geographical range. This allows reduction of the load to generate the correspondence information.

Further, in the terminal number estimation device 10, the terminal number correction unit 16 extracts a plurality of correspondence information having the same area ID and determines each area (actual location area) to which the position indicated by the coordinate information of the extracted plurality of correspondence information belongs. Then, the terminal number correction unit 16 calculates the proportion of the number of correspondence information in each actual location area to the number of extracted plurality of correspondence information and uses it as a correction factor, and corrects the number of terminals acquired by the in-area terminal number acquisition unit 15 using the correction factor.

Consequently, even when the first location registration area and the actual location area of some mobile terminal 100 are different due to remote sensing of radio waves, it is possible to correct the estimated number of mobile terminals 100. It is thereby possible to estimate the number of terminals located in each area more accurately.

Second Embodiment

In the above first embodiment, an example in which the in-area terminal number acquisition unit 15 acquires the number of in-area terminals from the outside is described. However, when the area range set by Voronoi tessellation or the like is different from an actual area range, it causes an error when estimating the number of terminals in each area using a location registration signal. In the following second embodiment, an example that sets the area range more appropriately and estimates the number of terminals, which is, an example that estimates the area range of an area indicated by the area ID before estimating the number of terminals and then estimates the number of terminals using the estimated area range is described. Note that the system configuration of a communication system according to the second embodiment is the same as the system configuration according to the first embodiment in FIG. 1, and the description of the system configuration is omitted.

Figure 8:
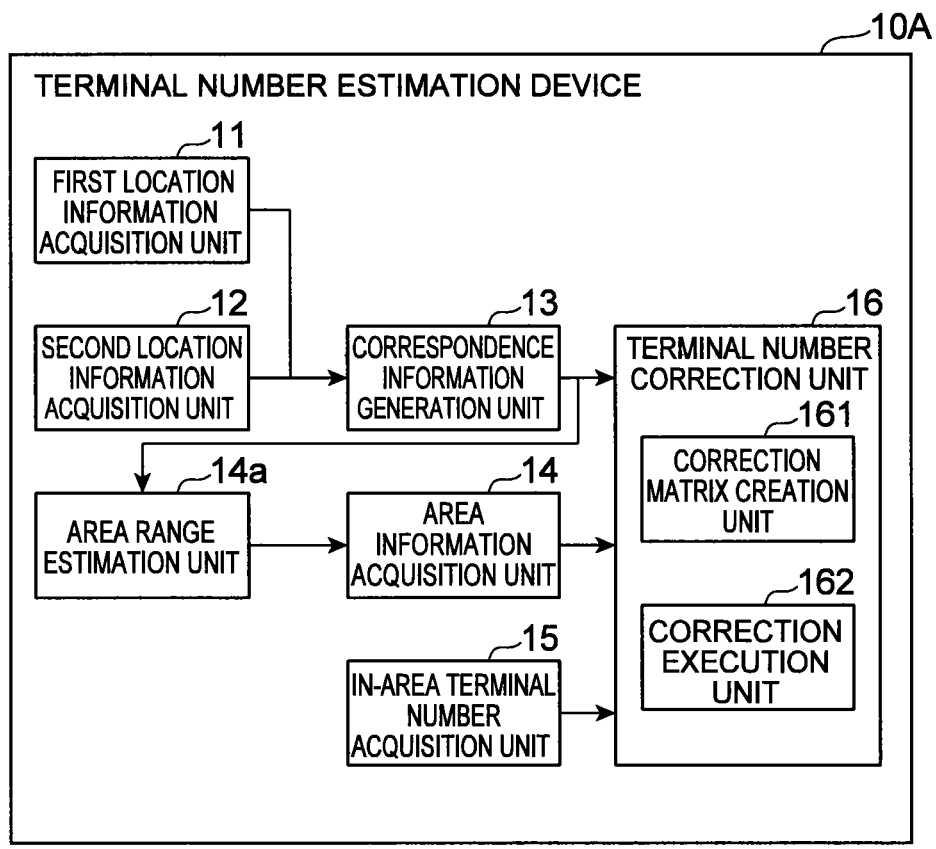
FIG. 8 is a block diagram showing a functional configuration of a terminal number estimation device according to a second embodiment.

The functions of a terminal number estimation device 10A are described hereinafter. FIG. 8 is a block diagram showing the functional configuration of the terminal number estimation device 10A. As shown in FIG. 8, the terminal number estimation device 10A includes the same elements as the terminal number estimation device 10 according to the first embodiment, and the functions of the respective elements are substantially the same, and therefore differences from the terminal number estimation device 10 according to the first embodiment are mainly described below. The terminal number estimation device 10A further includes an area range estimation unit 14a in addition to the elements of the terminal number estimation device 10.

The area range estimation unit 14a functions as an area range estimation means that estimates the area range based on the correspondence information generated by the correspondence information generation unit 13. To be specific, the area range estimation unit 14a reads the correspondence information stored in the correspondence information management table. Then, the area range estimation unit 14a estimates the border from an adjacent area based on the area ID and the coordinate information contained in the correspondence information. The estimation of the area border is performed on the basis of known clustering such as kNN, SVM and Bayesian techniques, for example. (each clustering technique is described in "Kenichiro Ishii, "Wakariyasui Pattern Recognition". Ohmsha, Ltd, ISBN 4-274-13149-1, 1998", "Mingzhe Jin ed., "Data Science Learning Through R", Morikita Publishing Co., Ltd., ISBN 4-627-09601-1, 2007" and the like.

The area range estimation unit 14a combines borders between a certain area and adjacent areas and thereby decides an area range, which is a geographical range of the area. The area range estimation unit 14a then generates area information associating the area ID and the area range information about the area range of an area indicated by the area ID. Note that the area range information is represented by a combination of coordinates indicating borders from adjacent areas, a combination of functions indicating borderlines from adjacent areas or the like. The area range estimation unit 14a then supplies the generated area information to the area information acquisition unit 14.

The area information acquisition unit 14 acquires the area information from the area range estimation unit 14a and supplies the acquired area information to the terminal number correction unit 16.

Figure 9:
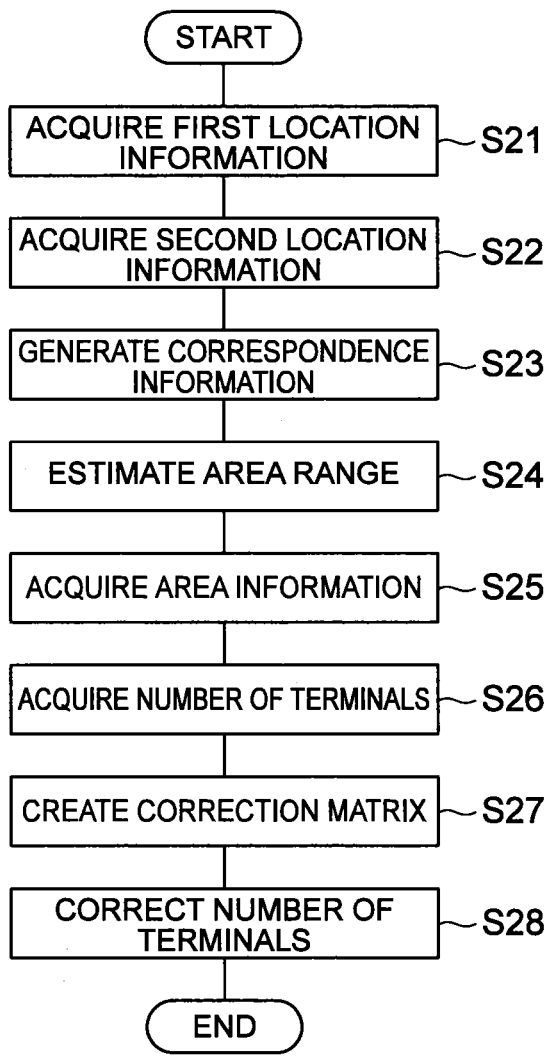
FIG. 9 is a flowchart showing a terminal number estimation process of the terminal number estimation device according to the second embodiment.

The operation of the terminal number estimation device 10A is described hereinafter with reference to FIG. 9. FIG. 9 is a flowchart showing a terminal number estimation process of the terminal number estimation device 10A. Processing of S21 to S23 is respectively the same as processing of S11 to S13 in FIG. 7 and not redundantly described.

After S23, the area range estimation unit 14a estimates the area range of each area based on the correspondence information stored in the correspondence information management table (S24). Then, the area range estimation unit 14a generates the area information associating the area ID and the area range information about the area range of an area identified by the area ID. After that, the area information acquisition unit 14 acquires the area information from the area range estimation unit 14a (S25, area information acquisition step).

Processing of S26 to S28 is respectively the same as processing of S15 to S17 in FIG. 7 and not redundantly described.

Effects of the terminal number estimation device 10A are described hereinafter. In the terminal number estimation device 10A, the area range estimation unit 14a estimates the area range of an area identified by the area ID based on the correspondence information generated by the correspondence information generation unit 13, and the area information acquisition unit 14 acquires the area range information about the area range estimated by the area range estimation unit 14a and the area ID of this area as the area information.

In this manner, by estimating the area range of an area identified by the area ID based on the correspondence information associating the area where the mobile terminal 100 has transmitted the first location information and the location where the mobile terminal 100 has transmitted the second location information, it is possible to estimate the number of terminals located in each area based on the more appropriate area range. This further improves the accuracy of terminal number estimation.

Third Embodiment

In the above first and second embodiments, an example in which the correction matrix M is created based on the correspondence information generated by the correspondence information generation unit 13 and the area information acquired by the area information acquisition unit 14 is described. However, the mobile terminal 100 that is located in a GPS blind area, which is an area where radio waves from GPS satellites do not reach, does not transmit the second location information. Accordingly, the correspondence information generated by the correspondence information generation unit 13 does not contain information having coordinates in the GPS blind area, and there is a possibility that the created correction matrix M is not appropriate. In the following third embodiment, an example that creates the correction matrix M with the GPS blind area taken into account and makes correction of the number of terminals, which is an example that makes adjustment of the correction vector and creates the correction matrix M using the adjusted correction vector is described. Note that the system configuration of a communication system according to the third embodiment is the same as the system configuration according to the first embodiment in FIG. 1, and the description of the system configuration is omitted.

Figure 10:
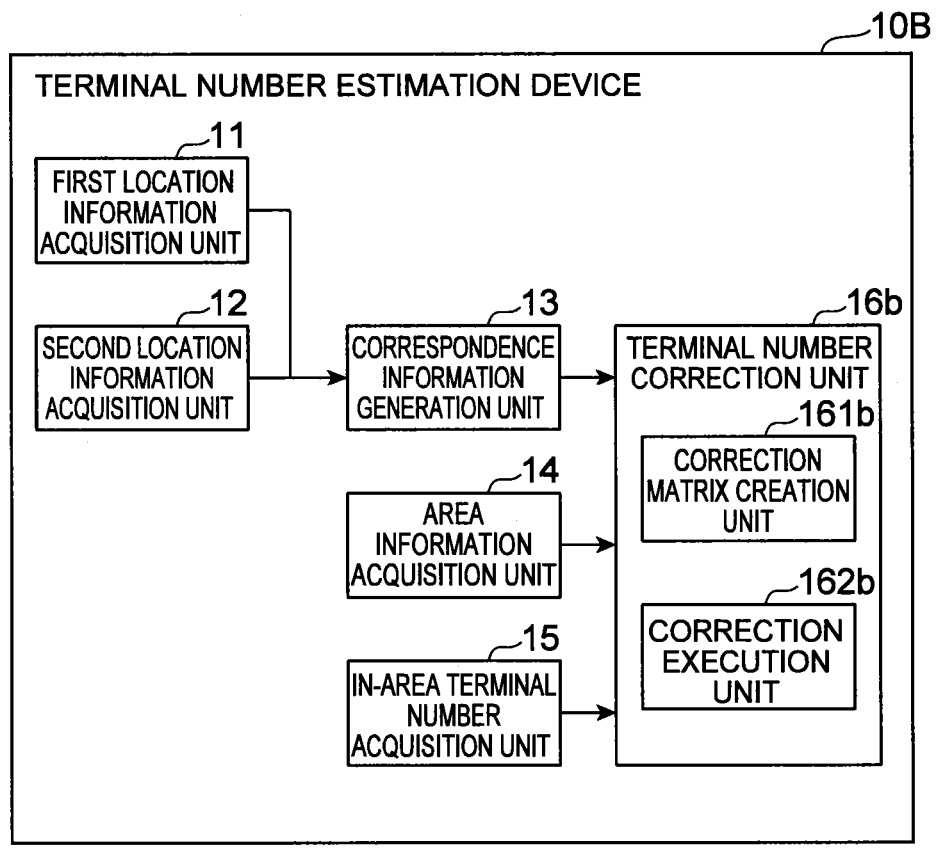
FIG. 10 is a block diagram showing a functional configuration of a terminal number estimation device according to a third embodiment.

The functions of a terminal number estimation device 10B are described hereinafter. FIG. 10 is a block diagram showing the functional configuration of the terminal number estimation device 10B. As shown in FIG. 10, the terminal number estimation device 10B includes the same elements as the terminal number estimation device 10 according to the first embodiment, and the functions of the respective elements are substantially the same, and therefore differences from the terminal number estimation device 10 according to the first embodiment are mainly described below. The terminal number estimation device 10B includes a terminal number correction unit 16b in place of the terminal number correction unit 16 of the terminal number estimation device 10.

The terminal number correction unit 16b corrects the number of terminals acquired by the in-area terminal number acquisition unit 15 by taking the GPS blind area into consideration. The terminal number correction unit 16b includes a correction matrix creation unit 161b and a correction execution unit 162b.

The correction matrix creation unit 161b functions as a correction matrix creation means that creates a correction matrix for correcting the number of terminals acquired by the in-area terminal number acquisition unit 15. To be more specific, the correction matrix creation unit 161b calculates the actual location area ratio for the correspondence information having the same area ID in the same manner as the correction matrix creation unit 161.

Further, the correction matrix creation unit 161b estimates the number of first location registration terminals in each area based on the first location information during a creation target period of correspondence information. The correction matrix creation unit 161b then calculates the proportion of the number of first location registration terminals in another area (which is equivalent to "second proportion" in CLAIMS) with reference to any area based on the estimated number of first location registration terminals in each area. First, the correction matrix creation unit 161b calculates the number of correspondence information having the area ID of each area based on the area ID of the correspondence information stored in the correspondence information management table. Then, the correction matrix creation unit 161b calculates the proportion of the number of correspondence information in another area (which is equivalent to "first proportion" in CLAIMS) with reference to the area which is used as a reference when calculating the proportion of the number of first location registration terminals.

Then, the correction matrix creation unit 161b compares the calculated proportion of the number of first location registration terminals with the calculated proportion of the number of correspondence information in each area. When there is a difference between them, the correction matrix creation unit 161b calculates an adjustment factor for adjusting the proportion of the number of correspondence information of each area so that they become the same proportion, determining that the correspondence information for the GPS blind area has not been generated. Then, the correction matrix creation unit 161b adjusts the proportion of the number of correspondence information of a corresponding area in the actual location area ratio based on the calculated adjustment factor. Then, the correction matrix creation unit 161b calculates the proportion of each area of the actual location area ratio after adjustment and thereby creates the correction vector. The correction matrix creation unit 161b then creates the correction matrix M by arranging the correction vectors of the respective areas after adjustment with transposition based on the above equation (1).

Figure 11:
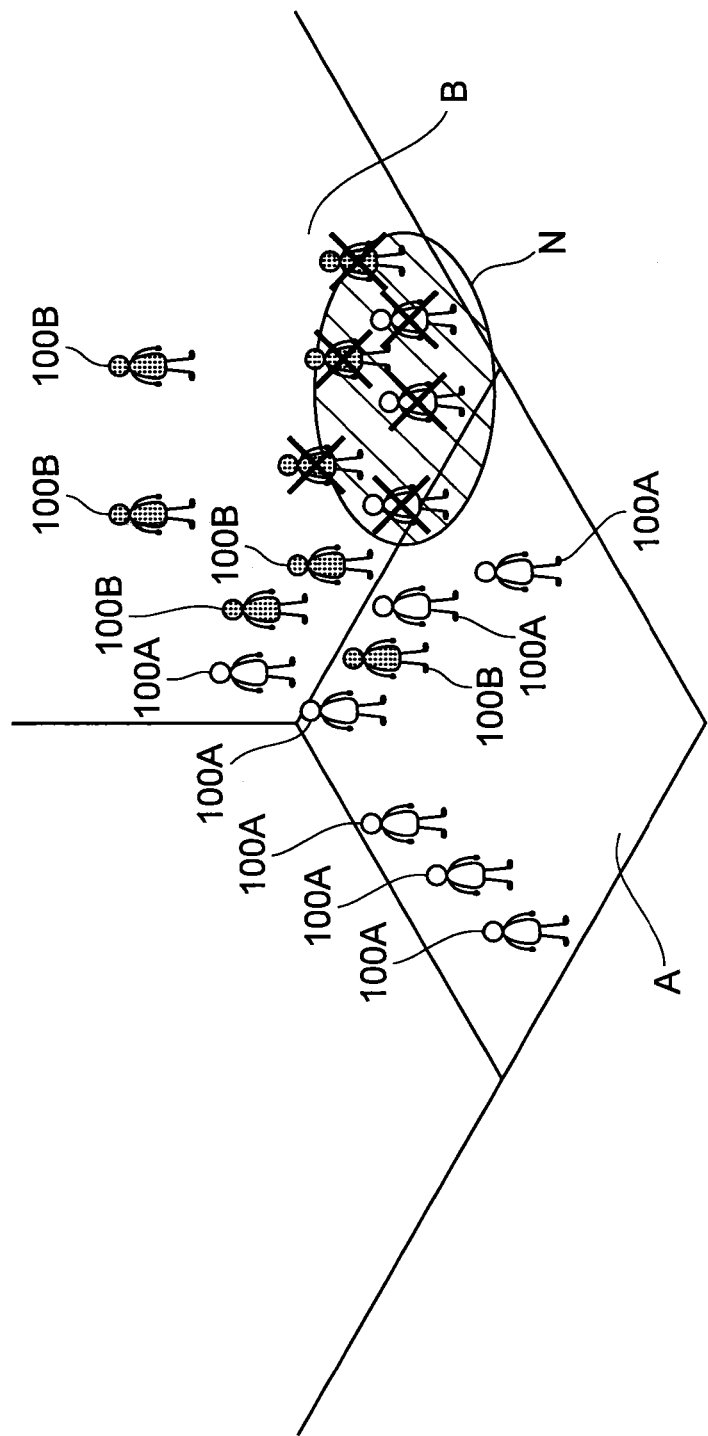
FIG. 11 is a view showing an example of a case where a GPS blind area exists.

FIG. 11 is a view showing another example of locations of the mobile terminals 100 that have transmitted the first location information. In the example shown in FIG. 11, a plurality of mobile terminals 100A that have transmitted the first location information of the area A and a plurality of mobile terminals 100B that have transmitted the first location information of the area B are respectively present in specified locations. Further, an area N that is the GPS blind area exists in the area A and the area B.

The correction matrix creation unit 161b calculates the ratio (actual location area ratio) of the number of mobile terminals 100A in each area (actual location area) to which the actually located location belongs to the total number of mobile terminals 100A that have transmitted the first location information of the area A. Specifically, the correction matrix creation unit 161b reads the correspondence information whose area ID is A among the correspondence information stored in the correspondence information management table. Then, the correction matrix creation unit 161b determines an area (actual location area) to which the coordinate position indicated by the coordinate information of the read correspondence information belongs based on the area information acquired by the area information acquisition unit 14.

In the example of FIG. 11, in the correspondence information stored in the correspondence information management table, among the total number 7 of correspondence information whose area ID is A, the number of correspondence information whose actual location area is A is 6, and the number of correspondence information whose actual location area is B is 1. Thus, the actual location area ratio of the correspondence information whose area ID is A is 6:1. Likewise, the actual location area ratio of the correspondence information whose area ID is B is 1:4.

Next, the correction matrix creation unit 161b estimates the number of first location registration terminals in the area A and the area B based on the first location information during a creation target period of correspondence information. The correction matrix creation unit 161b counts the number of terminals that have transmitted the first location information in the area A and the area B for each area during the target information creation period by reference to the first location information management table, for example, and uses the number of terminals as the number of first location registration terminals in each area. It is assumed in this example that the number of first location registration terminals in the area A is 700, and the number of first location registration terminals in the area B is 1000.

Then, the correction matrix creation unit 161b calculates the proportion of the number of first location registration terminals of the area B with reference to the area A. As a result, the proportion of the number of first location registration terminals in the area B is 10/7. Further, the correction matrix creation unit 161b calculates the number of correspondence information having the area ID of each area based on the area ID of the correspondence information stored in the correspondence information management table. It is assumed in this example that the number of correspondence information having the area ID of A is 7, and the number of correspondence information having the area ID of B is 5. Then, the correction matrix creation unit 161b calculates the proportion of the number of correspondence information of the area B with reference to the area A. As a result, the proportion of the number of correspondence information in the area B is 5/7.

Then, the correction matrix creation unit 161b compares the calculated proportion 10/7 of the number of in-area terminals in the area B with the proportion 5/7 of the number of correspondence information in the area B, and thereby calculates the adjustment factor for adjusting the proportion of the number of correspondence information in the area B. In this case, the adjustment factor of the number of correspondence information in the area B is calculated as 2.0. Then, the correction matrix creation unit 161b adjusts the calculated actual location area ratio based on the calculated adjustment factor. The correction matrix creation unit 161b calculates the actual location area ratio after adjustment by multiplying the number of correspondence information whose area ID is A but whose actual location area is the area B by the adjustment factor. As a result, the actual location area ratio after adjustment is 6:2.

Then, the correction matrix creation unit 161b calculates, for the correspondence information whose area ID is A, the proportion of each actual location area and thereby creates the correction vector. Thus, the correction matrix creation unit 161b creates the correction vector a=[3/4, 1/4] of the area A. Likewise, the correction matrix creation unit 161b adjusts the actual location area ratio of the correspondence information whose area ID is B to 1:8 in the correspondence information stored in the correspondence information management table and creates the correction vector b=[1/9, 8/9] of the area B.

After adjusting the correction vector of each area, the correction matrix creation unit 161b creates the correction matrix M according to the above equation (1). In the example shown in FIG. 11, the correction matrix creation unit 161b creates the correction matrix M=[a$^T$,b$^T$].

$$\text{Correction matrix } M = \begin{pmatrix} 3/4 & 1/9 \\ 1/4 & 8/9 \end{pmatrix}$$

The correction execution unit 162b functions as a correction execution means that executes correction of the number of terminals acquired by the in-area terminal number acquisition unit 15 by using the correction matrix M created by the correction matrix creation unit 161b. The correction execution unit 162b calculates a corrected terminal number E by the above equation (2). This is described using the example shown in FIG. 11. Assume that the number of terminals nA of the area A acquired by the in-area terminal number acquisition unit 15 is 200, and the number of terminals nB of the area B is 90. Thus, the terminal number vector n=[n$_A$,n$_B$]=[200, 90]. In this case, the correction execution unit 162b calculates the corrected terminal number E based on the above equation (2). As a result, the number of terminals of the area A after correction is 160, and the number of terminals of the area B after correction is 130.

Figure 12:
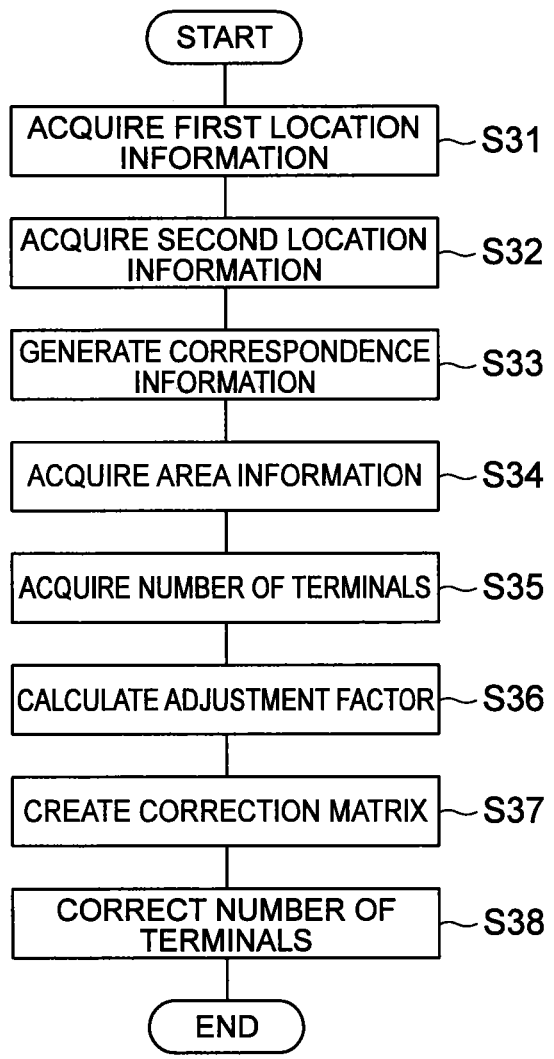
FIG. 12 is a flowchart showing a terminal number estimation process of the terminal number estimation device according to the third embodiment.

The operation of the terminal number estimation device 10B is described hereinafter with reference to FIG. 12. FIG. 12 is a flowchart showing a terminal number estimation process of the terminal number estimation device 10B. Processing of S31 to S35 is respectively the same as processing of S11 to S15 in FIG. 7 and not redundantly described.

After S35, the correction matrix creation unit 161b of the terminal number correction unit 16b calculates the number of first location registration terminals in each area based on the first location information. Further, the correction matrix creation unit 161b calculates the number of correspondence information having the area ID of each area based on the correspondence information generated by the correspondence information generation unit 13. Then, the correction matrix creation unit 161b calculates the proportion of the number of first location registration terminals in each area and the proportion of the number of correspondence information having the area ID of each area and compares them.

As a result of comparison, when they are different, the correction matrix creation unit 161b calculates the adjustment factor that makes the proportion of the number of correspondence information having the area ID of each area equal to the proportion of the number of first location registration terminals in each area (S36). Next, the correction matrix creation unit 161b calculates, for the correspondence information having the same area ID, the number of correspondence information in each actual location area based on the correspondence information generated by the correspondence information generation unit 13 and the area information acquired by the area information acquisition unit 14. Then, the correction matrix creation unit 161b makes adjustment by multiplying the number of correspondence information in each actual location area by the adjustment factor, calculates the proportion of the number of correspondence information in each actual location area after adjustment to the total number of correspondence information having the same area ID, and thereby creates the correction vector. The correction matrix creation unit 161b then creates the correction matrix M using the correction vector of each area based on the above-described equation (1) (S37, terminal number correction step). Then, the correction execution unit 162b corrects the number of terminals acquired by the in-area terminal number acquisition unit 15 by using the correction matrix M created by the correction matrix creation unit 161b based on the above-described equation (2) (S38, terminal number correction step).

Effects of the terminal number estimation device 10B are described hereinafter. The mobile terminal 100 can transmit the first location information even when it is located in the GPS blind area. Thus, in the terminal number estimation device 10B, the terminal number correction unit 16b first estimates the number of first location registration terminals, which is the number of mobile terminals 100 that have transmitted the first location information of each area, based on the first location information. Then, the terminal number correction unit 16b calculates the adjustment factor for each area, assuming that the proportion of the number of first location registration terminals in each area is the proportion of the number of correspondence information having the area ID indicating each area when there is no GPS blind area. Then, the terminal number correction unit 16b adjusts the correction vector using the calculated adjustment factor and then corrects the number of terminals located in each area.

It is thereby possible to adjust the correction factor by taking the correspondence information that has not been generated due to the GPS blind area into consideration. It is thus possible to estimate the number of terminals with the GPS blind area into consideration, which further improves the accuracy of estimation of the number of terminals located in each area.

(Alternative Example of Terminal Number Estimation Device)

The correspondence information generation unit 13 in the terminal number estimation device 10, 10A and 10B according to the first to third embodiments generates the correspondence information associating the area ID contained in the first location information and the coordinate information contained in the second location information; however, the correspondence information may be generated by another way. An alternative example of the correspondence information generation process performed by the correspondence information generation unit 13 is described hereinbelow.

In this alternative example, the correspondence information generation unit 13 estimates the location (coordinate information) of the mobile terminal 100 at the time indicated by the first time information contained in the first time information based on the second location information, and generates the correspondence information based on the estimated coordinate information and the area ID contained in the first location information.

The first location information contains the area ID but does not contain the coordinate information indicating the position where the mobile terminal 100 has been located when the first location information has been acquired. On the other hand, the second location information contains the coordinate information indicating the position where the mobile terminal 100 has been located when the second location information has been transmitted. Thus, when estimating the location of the mobile terminal 100 at the time indicated by the first time information in certain specified first time information, the correspondence information generation unit 13 first extracts a specified number of second location information in which the time indicated by the second time information is earlier than the time indicated by the first time information in the specified first time information and further extracts a specified number of second location information in which the time indicated by the second time information is later than the time indicated by the first time information in the specified first time information, the extracted second location information having the same terminal ID as the terminal ID contained in the specified first time information. Accordingly, the time indicated by the first time information in the first time information is temporally between the times indicated by the second time information in the two second location information that are successive in time among the specified number of extracted second location information. Then, the location of the mobile terminal 100 at the time indicated by the first time information in the first time information is estimated by interpolation between the locations indicated by the coordinate information of the specified number of extracted second location information.

Figure 13:
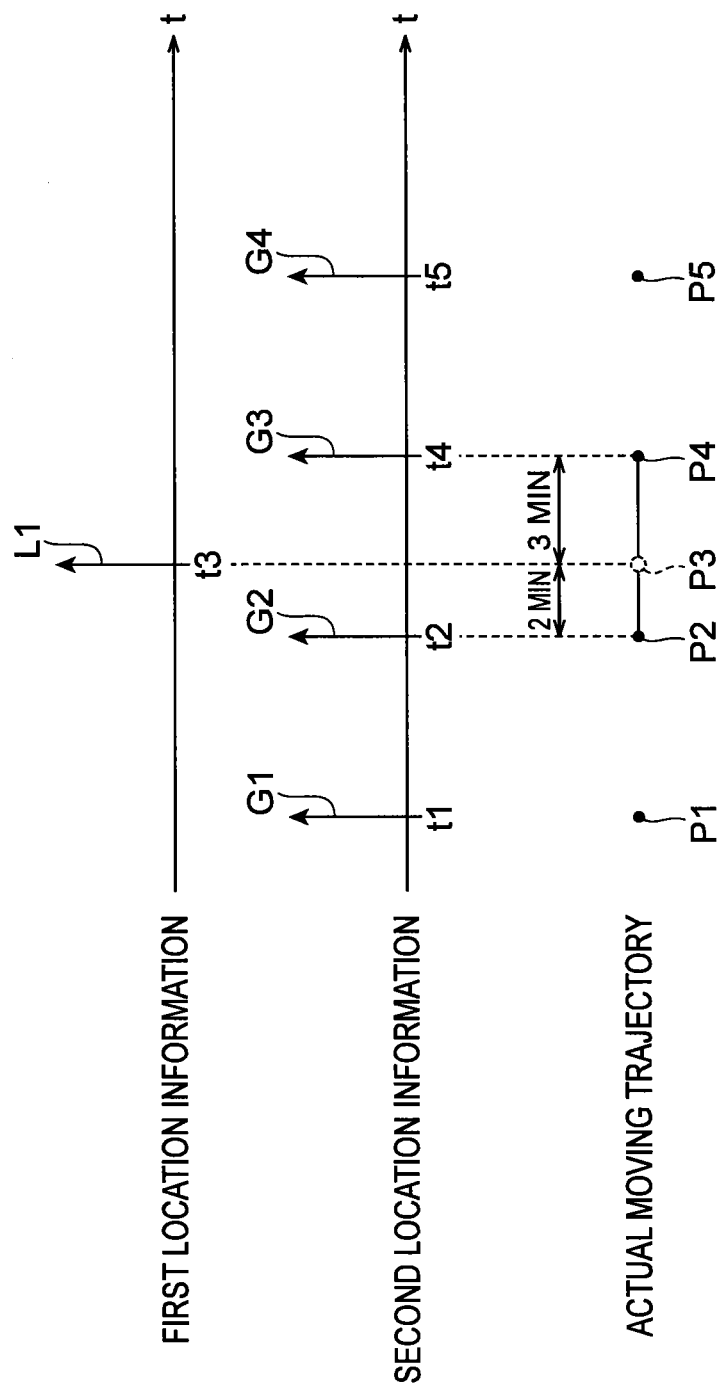
FIG. 13 is a view showing a relationship between timing when first location information and second location information are acquired and the actual moving trajectory of a mobile terminal.

A specific example of estimating the location of the mobile terminal 100 by linear interpolation is described hereinbelow. FIG. 13 shows a relationship between the timing when the first location information and the second location information are acquired and the actual moving trajectory of the mobile terminal. Note that, in FIG. 13, the first location information L 1 is acquired at time t3, the second location information G1 is acquired at time t1, the second location information G2 is acquired at time t2, the second location information G3 is acquired at time t4, and the second location information G4 is acquired at time t5. It is assumed that the first location information L1 and the second location information G1 to G4 have the same terminal ID.

Further, in FIG. 13, the actual locations of the mobile terminal that has transmitted the first location information L 1 and the second location information G1 to G4 at time t1 to t5 are indicated by positions P1 to P5, respectively. Note that the locations of the positions P1, P2, P4 and P5 can be acquired by the coordinate information contained in the second location information G1, G2, G3 and G4. In this alternative example, the position P3 of the mobile terminal 100 when the first location information L1 is acquired is estimated by linear interpolation.

First, the correspondence information generation unit 13 extracts the second location information G2 containing the second time information indicating the time that is earlier than and the closest to the time t3 indicated by the first time information of the first location information L1, and the second location information G3 containing the second time information indicating the time that is later than and the closest to the time t3. At this time, the correspondence information generation unit 13 extracts the second location information having the same terminal ID as the first location information L 1. Then, the correspondence information generation unit 13 sets the coordinate information contained in the second location information G2, G3 as the coordinate information of the positions P2 and P4 at the time t2, t4.

Then, the correspondence information generation unit 13 calculates a time difference between the time t2 indicated by the second time information of the second location information G2 and the time t3 indicated by the first time information of the first location information L 1. It is assumed in this example that the time difference between the time t2 and the time t3 is 2 minutes. Likewise, the correspondence information generation unit 13 calculates a time difference between the time t3 indicated by the first time information of the first location information L1 and the time t4 indicated by the second time information of the second location information G3. It is assumed in this example that the time difference between the time t3 and the time t4 is 3 minutes. Based on the coordinate information of the positions P2 and P4, the time difference (2 minutes) between the time t2 and the time t3 and the time difference (3 minutes) between the time t3 and the time t4 obtained as above, the position P3 of the mobile terminal 100 at the time t3 is estimated by linear interpolation. Specifically, it is assumed that the mobile terminal 100 that is located in the position P2 at the time t2 has moved linearly from the position P2 to the position P4, and the time taken to move from the position P2 to the position P4 is 5 minutes, which is a time difference between the time t2 and the time t4. Then, by the ratio (which is 2:3 in this example) of the time difference (2 minutes) between the time t2 and the time t3 and the time difference (3 minutes) between the time t3 and the time t4, a line segment that linearly connects the position P2 and the position P4 is proportionally divided, and the coordinates of the divided position are calculated, thereby estimating the coordinates of the position P3 of the mobile terminal 100 at the time t3.

Note that the correspondence information generation unit 13 extracts the second location information which is acquired at the time that is the closest to the time t3 indicated by the first time information of the first location information L 1 (in this example, it is the second location information G2 acquired at the time t2). Then, the correspondence information generation unit 13 calculates a time difference (2 minutes in this example) between the time t2 indicated by the second time information contained in the extracted second location information G2 and the time t3 indicated by the first time information of the first location information L1. When the time difference is not within a predetermined specified value (for example, 5 minutes), the correspondence information generation unit 13 may refrain from generating the correspondence information for the first location information L1.

Then, the correspondence information generation unit 13 generates the correspondence information by associating the area ID contained in the first location information L 1 and the coordinate information of the mobile terminal 100 at the time indicated by the first time information of the first location information L1, which is estimated by linear interpolation. Note that the correspondence information generation unit 13 may calculate a time difference between the time indicated by the second time information and the time indicated by the first time information as time difference information and associate the time difference information to the correspondence information.

Figure 14:
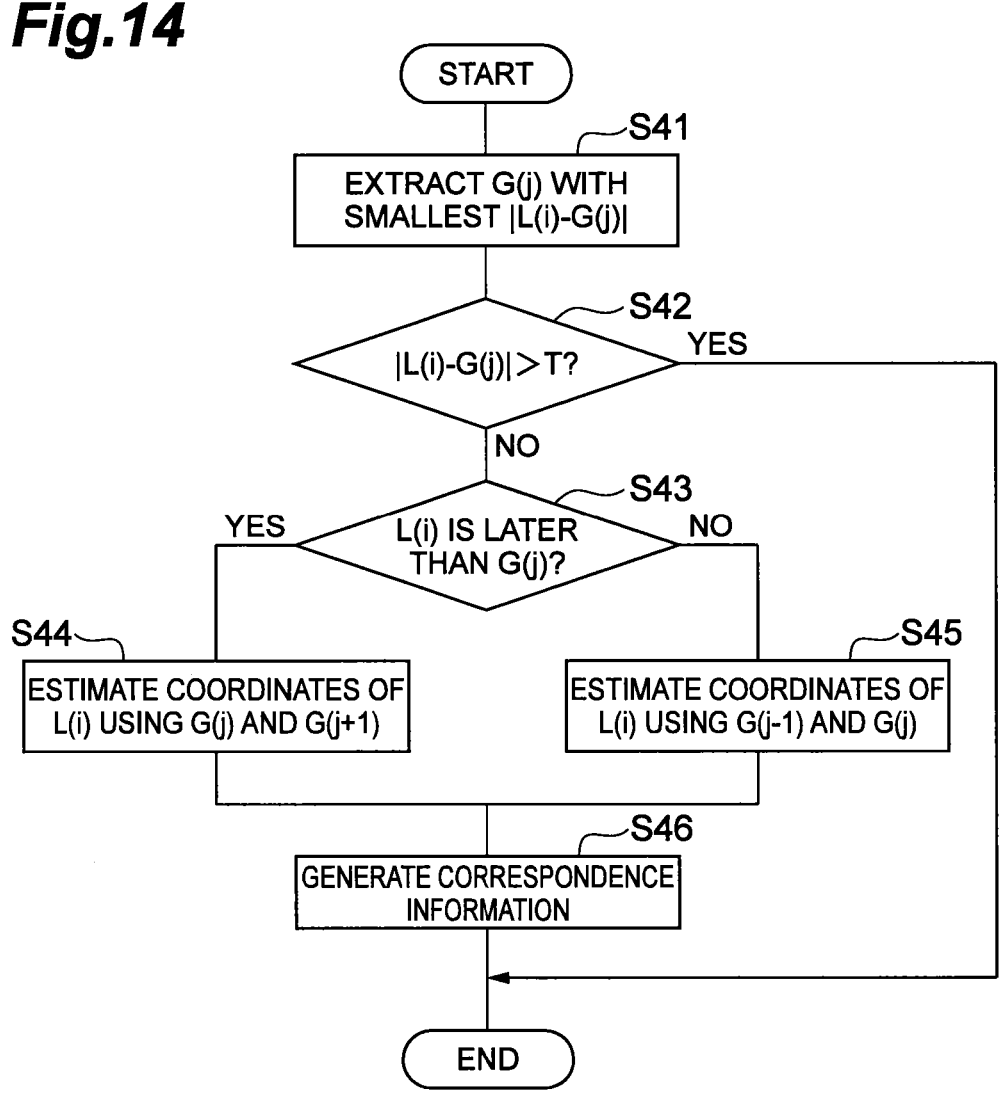
FIG. 14 is a flowchart showing a correspondence information generation process performed by a correspondence information generation unit in an alternative example.

A flow of the process for the correspondence information generation unit 13 to generate the correspondence information in this alternative example is described hereinafter. FIG. 14 is a flowchart showing the correspondence information generation process performed by the correspondence information generation unit 13 in this alternative example. Note that the correspondence information generation process shown in FIG. 14 is performed for all of the first location information acquired by the first location information acquisition unit 11.

In the case of performing the correspondence information generation process for certain specified first location information L(i) (where i=1, 2, 3, . . . ), the correspondence information generation unit 13 first extracts second location information G(j) (where j=1, 2, 3, . . . ) where the absolute value of a time difference between the first time information of the first location information L(i) and the second time information of the second location information G(j) is the smallest (S41). Then, the correspondence information generation unit 13 determines whether the absolute value of a time difference between the first location information L(i) and the extracted second location information G(j) is larger than a predetermined specified value T (for example, 5 minutes) (S42).

When the absolute value of a time difference between the first time information of the first location information L(i) and the second time information of the extracted second location information G(j) is larger than the specified value T (YES in S42), the correspondence information generation unit 13 does not generate the correspondence information for the first location information L(i) and the process ends. On the other hand, when the absolute value of a time difference between the first time information of the first location information L(i) and the second time information of the extracted second location information G(j) is equal to or smaller than the specified value T (NO in S42), the correspondence information generation unit 13 determines whether the time indicated by the first time information of the first location information L(i) is later than the time indicated by the second time information of the extracted second location information G(j) (S43).

When the time indicated by the first time information of the first location information L(i) is later than the time indicated by the second time information of the extracted second location information G(j) (YES in S43), the correspondence information generation unit 13 estimates the coordinates of the first location information L(i) by linear interpolation as described above using the second location information G(j) and the second location information G(j+1) (S44). On the other hand, when the time indicated by the first time information of the first location information L(i) is not later than the time indicated by the second time information of the extracted second location information G(j) (NO in S43), the correspondence information generation unit 13 estimates the coordinates of the first location information L(i) by linear interpolation as described above using the second location information G(j−1) and the second location information G(j) (S45).

Then, the correspondence information generation unit 13 generates the correspondence information by associating the area ID contained in the first location information L(i) and the coordinate information estimated by the linear interpolation (S46). The process after generating the correspondence information is the same as that of the first to third embodiments described above.

As described above, in this alternative example, by estimating the coordinates of the mobile terminal 100 at the time indicated by the first time information of the first location information based on the second location information, the coordinates of the mobile terminal 100 at the time when the first location information is acquired can be obtained more accurately. By generating the correspondence information using the coordinate information estimated in this manner and estimating the number of terminals located in each area using the correspondence information, it is possible to estimate the number of terminals more accurately.

Note that, although the coordinate information of the mobile terminal 100 at the time when the first location information is acquired is estimated by performing linear interpolation in the above-described alternative example, it may be estimated by a method other than the linear interpolation. As one example, the estimation may be made by spline interpolation, Bezier interpolation or the like using k number of second location information before and after the time when the first location information is acquired.

Figure 15:
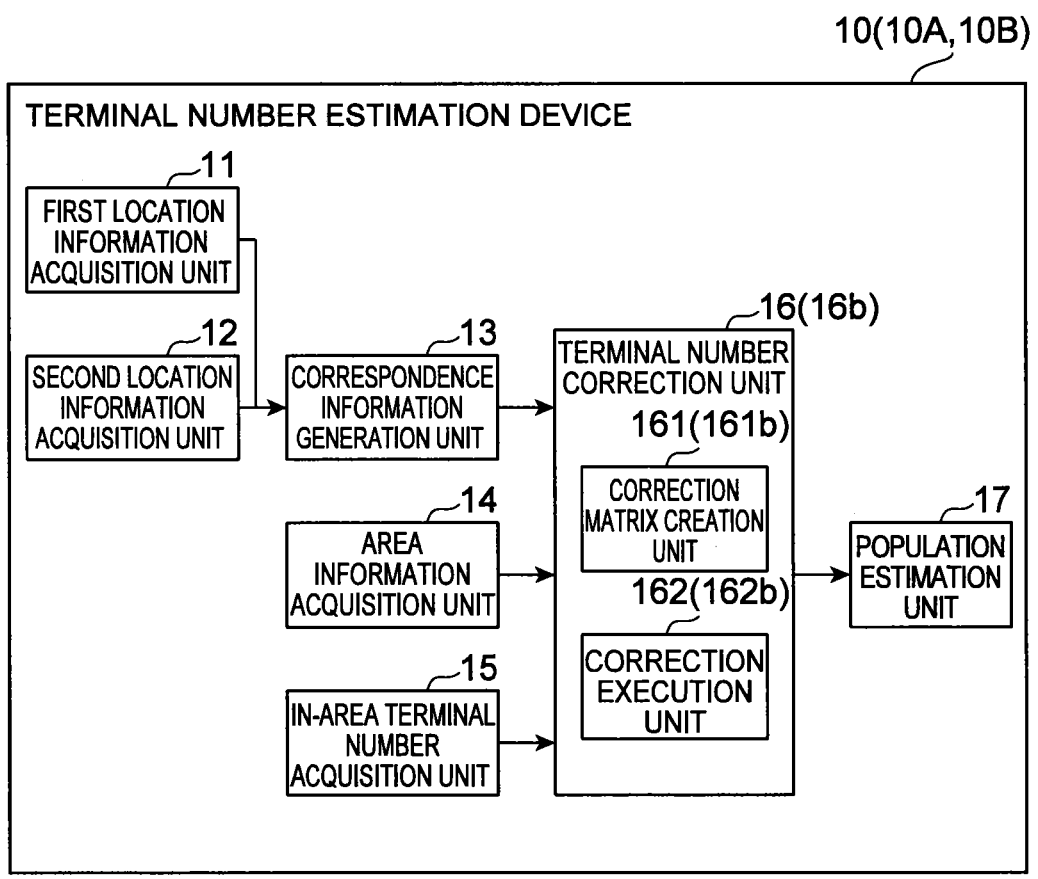
FIG. 15 is a view showing a configuration of an alternative example of a terminal number estimation device according to first to third embodiments.

Further, as another alternative example, the terminal number estimation device 10, 10A and 10B according to the first to third embodiments generate may further include a population estimation unit (which is equivalent to "population estimation means" in CLAIMS) 17 that estimates the population in each area as shown in FIG. 15. The population estimation unit 17 estimates the population based on a predetermined enlargement factor and the number of terminals obtained by the terminal number correction unit 16, 16b. As the enlargement factor, the inverse number of "the product of the in-area rate and the ownership rate of mobile terminals (which is the ratio of the number of in-area terminals to the population)" may be used as an example. The "in-area rate" is the ratio of the number of in-area terminals to the number of contracts of the mobile terminals 100, and the "ownership rate" is the ratio of the number of contracts to the population. It is preferred that the enlargement factor is derived for each unit of population estimation, which is a measure for the population estimation unit 17 to estimate the population, though not mandatory. The "unit of population estimation" may be an attribute, place, time period or the like, for example, and it may be on the basis of prefecture in address, age group of every 5 years, gender, time period of every one hour or the like.

A unit of enlargement factor calculation for calculating the enlargement factor may be on the basis of prefecture in address, age group of every 5 or 10 years, gender, time period of every one hour or the like, or a combination of two or more may be used. For example, when the unit of enlargement factor calculation is "males in their twenties living in Tokyo", pyramid data representing the number of users is obtained by extracting the location data corresponding to males in their twenties who live in Tokyo (whose address information in user attribute is Tokyo) and counting the number of terminals, and population pyramid data for the males in their twenties living in Tokyo is acquired. Note that, when obtaining the pyramid data representing the number of users, for the condition of "living in Tokyo", the location data whose address information in user attribute is Tokyo, not only the location data of users who are located in Tokyo, are extracted.

Then, the acquisition rate of location data (i.e. the number of in-area terminals/population) in the unit of enlargement factor calculation (which is males in their twenties living in Tokyo in this example) is calculated from the user number pyramid data and the population pyramid data, and the inverse number of the obtained "acquisition rate of location data" can be derived as the enlargement factor. Note that, although the unit of enlargement factor calculation and the unit of population estimation are equal in this description, this is just an example and it is not limited thereto.

Note that the population estimation unit 17 may be placed outside the terminal number estimation device 10, 10A and 10B.

Fourth Embodiment

In the above-described embodiments and alternative examples, the correspondence information generation unit 13 generates the correspondence information based on the first location information and the second location information. In this embodiment, an example that directly acquires the correspondence information is described. Note that the system configuration of a communication system according to the fourth embodiment is the same as the system configuration according to the first embodiment in FIG. 1, and the description of the system configuration is omitted.

Figure 16:
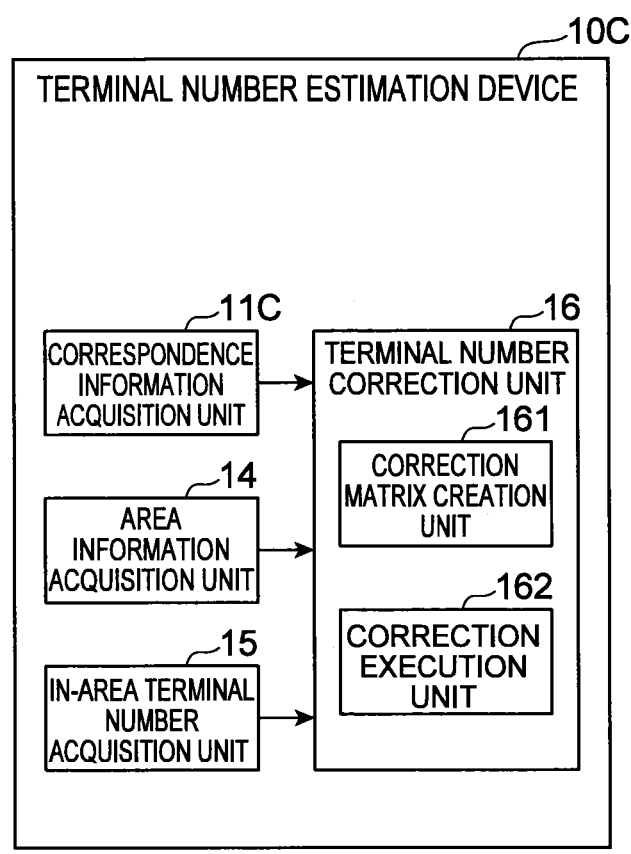
FIG. 16 is a block diagram showing a functional configuration of a terminal number estimation device according to a fourth embodiment.

The functions of a terminal number estimation device 10C according to the fourth embodiment are described hereinafter. FIG. 16 is a block diagram showing the functional configuration of the terminal number estimation device 10C. As shown in FIG. 16, the terminal number estimation device 10C includes a correspondence information acquisition unit (correspondence information acquisition means) 11C, an area information acquisition unit 14, an in-area terminal number acquisition unit 15, and a terminal number correction unit 16. Note that the same elements as the elements of the terminal number estimation device 10 according to the first embodiment are denoted by the same reference symbols and not redundantly described.

According to 3GPP Technical Report (3GPP TR 36.805), which is the international standard of mobile terminals, information (which is referred to hereinafter as "GPS information with area information") associating an area ID where the mobile terminal 100 is located when the mobile terminal 100 uses GPS, GPS information (coordinate information) transmitted from the mobile terminal 100, and positioning time information is generated. The GPS information with area information is acquired by a GPS information with area information collection unit, which is not shown. The GPS information with area information collection unit may be included in the social sensor unit 501 or the mobile demography unit 503. The correspondence information acquisition unit 11C acquires the GPS information with area information from the GPS information with area information collection unit, which is not shown.

The correspondence information acquisition unit 11C extracts the correspondence information (see FIG. 18) composed of the area ID and the coordinate information among the GPS information with area information and outputs the extracted correspondence information to the terminal number correction unit 16. The subsequent process is the same as that of the first embodiment.

In this manner, when the GPS information with area information can be acquired, it is possible to correct the number of terminals of the terminal number estimation device 10 using the correspondence information contained in the GPS information with area information. It is thereby possible to reduce the processing steps compared with the case of generating the correspondence information using the first location information and the second location information.

Note that, as shown in FIG. 17, a plurality of area IDs are associated with one GPS information with area information in some cases. Further, in such a case, quality information such as radio wave reception level information between an antenna that forms an area (sector) and the mobile terminal 100, GPS error radius, positioning accuracy (a value that is set depending on whether positioning by satellite or positioning by base station and, in the case of satellite positioning, the number of satellites sensed etc.) is sometimes added to each area ID or the like. Further, a connected area is an area where the reception level is the highest, and a connection candidate area is an area where the reception level is the second highest. Note that there may be a plurality of connection candidate areas. In this case, the correspondence information acquisition unit 11C can generate and acquire the correspondence information based on the quality information (for example, using the area ID with the highest radio wave reception level etc.).

The GPS information with area information can be treated as the correspondence information in which a time difference between the first location information and the second location information described in the first embodiment or the like is zero. Note that, in this embodiment also, the correspondence information may be generated by the method described in the first embodiment or the like, and the number of terminals may be corrected using both of the generated correspondence information and the correspondence information extracted from the GPS information with area information.

Further, the terminal number correction unit 16 can avoid using the correspondence information that is determined to be less reliable for the correction process based on the quality information contained in the correspondence information. A criterion for determining the reliability of the correspondence information differs depending on which information of the quality information contained in the correspondence information (GPS information with area information) the determination is based on. Three methods are described below.

First, a case of determining the reliability of the correspondence information based on the error radius of the GPS information with area information is described. As the error radius is smaller, the reliability of information is higher. Thus, when the value of "error radius" contained in the GPS information with area information is a specified threshold or higher, the terminal number correction unit 16 can determine that the reliability of the GPS information with area information is low and avoid using that information for the correction of the number of terminals. The specified threshold may be a predetermined fixed value or a variable value according to the size of the located area (a larger specified threshold for a larger located area etc.).

Next, a case of determining the reliability of the correspondence information based on the reception level of the GPS information with area information is described. As the reception level is higher, the reliability of information is higher. Thus, when the value of "reception level" of the connected area contained in the GPS information with area information is a specified threshold or lower, the terminal number correction unit 16 can determine that the reliability of the GPS information with area information is low and avoid using that information for the correction of the number of terminals. Note that, instead of the reception level of the connected area, the reception level of the connection candidate area may be used. Alternatively, both of the reception level of the connected area and the reception level of the connection candidate area may be used.

Note that, in the case where the GPS information with area information contains both of the reception level of the "connected area" and the reception level of the "connection candidate area", as a difference between the two reception levels is larger, the reliability of information is higher. For example, when the difference is a specified threshold or lower, the terminal number correction unit 16 can determine that the reliability of the GPS information with area information is low and avoid using that information for the correction of the number of terminals. Further, in the case where the GPS information with area information contains the reception levels of a plurality of "connection candidate areas", a difference between the reception level of the "connected area" and the reception level of the "connection candidate area" with the highest reception level among the reception levels of a plurality of "connection candidate areas" may be used. Further, in the case where the GPS information with area information does not contain the reception level of the "connected area" and contains the reception levels of a plurality of "connection candidate areas", a difference between the highest reception level and the second highest reception level may be used.

Third, a case of determining the reliability of the correspondence information based on the accuracy of the GPS information with area information is described. As the accuracy is higher, the reliability of information is higher. Thus, when the value of "accuracy" contained in the GPS information with area information is a specified threshold or lower, the terminal number correction unit 16 can determine that the reliability of the GPS information with area information is low and avoid using that information for the correction of the number of terminals.

Note that the reliability of the GPS information with area information may be determined by combining a plurality of arbitrary information of the quality information (including at least one of the error radius, the reception level and the accuracy) of the GPS information with area information (correspondence information). Note that the GPS information with area information contains at least any one of the reception level, the error radius, and the accuracy described above as the quality information.

Fifth Embodiment

In the first to third embodiments described above, the in-area terminal number acquisition unit 15 acquires the number of mobile terminals 100 located in an area from an external server or the like. In this embodiment, an embodiment in which the in-area terminal number acquisition unit calculates a feature quantity based on the first location information (location registration information) acquired by the first location information acquisition unit 11 and calculates the number of terminals using the calculated feature quantity is described. In this embodiment, the description is based on the assumption that the first location information is location registration information. Note that the "feature quantity" is information corresponding to an estimated generation density for the location registration information generated by the mobile terminal. Further, the "estimated generation density" indicates an estimated value of the number of location registration information that are generated by the mobile terminal that has generated the location registration information per unit time around the time when the location registration information is generated.

The feature quantity can be conceptually obtained as follows. Specifically, the feature quantity can be obtained by including a location data acquisition means that acquires location data containing a terminal ID for identifying a mobile terminal, location information about the location of the mobile terminal, and location acquisition time information about a time when the location information is acquired, a before and after location data acquisition means that acquires, for certain first location data, location acquisition time information of second location data, which is location data immediately before the first location data, and location acquisition time information of third location data, which is location data immediately after the first location data, among location data containing the same identification information as the first location data, a feature quantity calculation means that calculates a feature quantity for the first location data based on two or more of the location acquisition time information of the first location data, the location acquisition time information of the second location data, and the location acquisition time information of the third location data, an observation target acquisition means that acquires one or a plurality of location data containing the location acquisition time information after the observation start time and before the observation end time of an observation period to be observed and containing location information associated with observation area information related to an observation area to be observed as observation target location data, and a terminal number estimation means that estimates the number of terminals located in the observation area during the observation period based on the feature quantity of the observation target location data and an observation period length, which is a difference between the observation start time and the observation end time.

Further, an enlargement factor storage means that stores an enlargement factor for converting the number of terminals into a population may be further included, and the terminal number estimation means may estimate the population located in the observation area during the observation period based on the feature quantity of the observation target location data, the observation period length, and the enlargement factor.

A specific process of calculating the feature quantity is described hereinafter. Note that the system configuration of a communication system according to the fifth embodiment is the same as the system configuration according to the first embodiment in FIG. 1, and the description of the system configuration is omitted.

Figure 19:
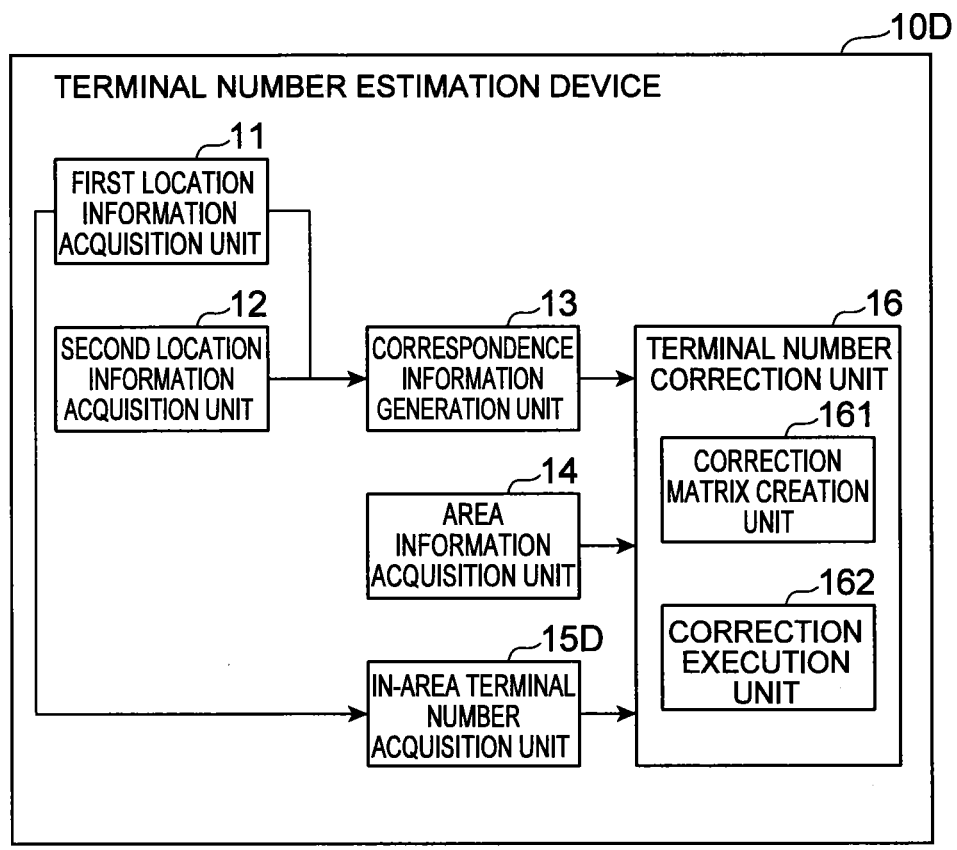
FIG. 19 is a block diagram showing a functional configuration of a terminal number estimation device according to a fifth embodiment.

The functions of a terminal number estimation device 10D according to the fifth embodiment are described hereinafter. FIG. 19 is a block diagram showing the functional configuration of the terminal number estimation device 10D. As shown in FIG. 19, the terminal number estimation device 10D includes a first location information acquisition unit 11, a second location information acquisition unit 12, a correspondence information generation unit 13, an area information acquisition unit 14, an in-area terminal number acquisition unit 15D, and a terminal number correction unit 16. Note that the same elements as the elements of the terminal number estimation device 10 according to the first embodiment are denoted by the same reference symbols and not redundantly described.

The in-area terminal number acquisition unit 15D acquires one or a plurality of location registration information that are acquired after the aggregation start time and before the aggregation end time of an aggregation time period as aggregation target location registration information from the first location information acquisition unit 11. Note that the aggregation time period is a time period during which the number of mobile terminals 100 is estimated (corrected) in the terminal number estimation device 10D.

The in-area terminal number acquisition unit 15D acquires, for the aggregation target location registration information (which is referred to hereinafter as "first location registration information") for which a feature quantity is to be obtained, the time when location registration information (which is referred to hereinafter as "second location registration information") immediately before the first location registration information is acquired and the time when location registration information (which is referred to hereinafter as "third location registration information") immediately after the first location registration information is acquired, among the location registration information having the same terminal ID as the first location registration information. Note that the in-area terminal number acquisition unit 15D does not necessarily acquire the whole of the second or third location registration information and may acquire at least information about the time contained in the location registration information.

The in-area terminal number acquisition unit 15D calculates a feature quantity for each of the first location registration information. For example, the in-area terminal number acquisition unit 15D calculates a difference between the time when the second location registration information is acquired and the time when the third location registration information is acquired as the feature quantity of the first location registration information.

Further, in the case where the time when the second location registration information is acquired is an abnormal value, which is the case where a difference between the time when the first location registration information is acquired and the time when the second location registration information is acquired is larger than a reference value (for example, one hour) in this example, the in-area terminal number acquisition unit 15D calculates the feature quantity of the first location registration information by using the time that is earlier than the time when the first location registration information is acquired by a predetermined time (for example, one hour) as the time when the second location registration information is acquired. Likewise, in the case where the time when the third location registration information is acquired is an abnormal value, which is the case where a difference between the time when the first location registration information is acquired and the time when the third location registration information is acquired is larger than a reference value (for example, one hour) in this example, the in-area terminal number acquisition unit 15D calculates the feature quantity of the first location registration information by using the time that is later than the time when the first location registration information is acquired by a predetermined time (for example, one hour) as the time when the third location registration information is acquired.

Such a process that is performed in the case where the time when the second or third location registration information is acquired is an abnormal value is not essential; however, by performing the above process, when the acquisition time interval of the location registration information becomes abnormally long due to the fact that the mobile terminal 100 is located outside of an area or the mobile terminal 100 is power off, it is possible to prevent the abnormally long acquisition time interval from causing serious effects.

The in-area terminal number acquisition unit 15D estimates the number of mobile terminals based on the feature quantity of the location registration information and a time length of the aggregation time period which is a difference between the aggregation start time and the aggregation end time. To be specific, the in-area terminal number acquisition unit 15D extracts the location registration information having the same area ID and estimates the number of mobile terminals based on the feature quantity associated with the extracted location registration information.

When estimating the number of mobile terminals, the in-area terminal number acquisition unit 15D uses a value obtained by dividing the sum of the feature quantities of the location registration information having the same area ID by twice the time length of the aggregation time period as the estimated number of mobile terminals, as described in detail later.

[Concept and Calculation Method of Mobile Terminal Number Estimation]

Figure 20:
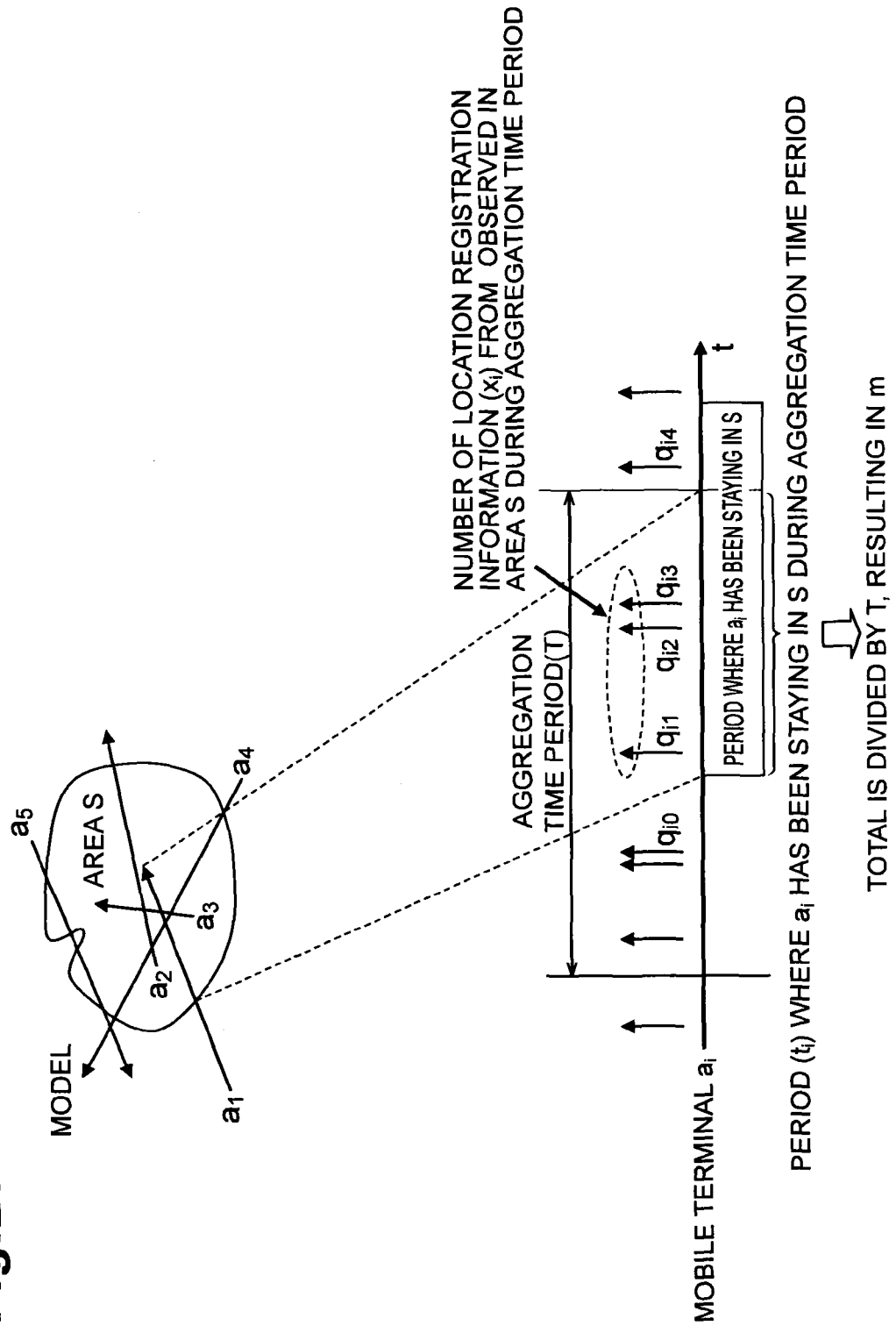
FIG. 20 is a view to describe the concept of terminal number estimation.

The concept and a calculation method of mobile terminal number estimation are described hereinafter. As shown in the model of FIG. 20, assume that, during a certain aggregation time period (with a length T), n number of mobile terminals $a_1, a_2, \ldots, a_n$ pass through an area S and the stay time of each mobile terminal $a_i$ in the area S during the aggregation time period is $t_i$ ($0 < t_i \leq T$). At this time, the number of mobile terminals m located in the area S (in practice, the average value of the number of mobile terminals m located in the area S during the aggregation time period) is represented by the following equation (3).

$$m = \sum_{i=1}^{n} t_i / T \qquad (3)$$

Specifically, a result of dividing the total of the stay time $t_i$ of each mobile terminal $a_i$ in the area S during the aggregation time period by the length T of the aggregation time period is estimated as the number of mobile terminals m. Note that, although the true value of the stay time $t_i$ of each mobile terminal $a_i$ in the area S during the aggregation time period is not observable, each mobile terminal $a_i$ transmits location registration information, and the location registration information is observable.

If the location registration information that is transmitted by the mobile terminal $a_i$ in the area S during the aggregation time period is $$q_{i1}, q_{i2}, \ldots, q_{ix_i}$$

(where $x_i$ is the total number of location registration information transmitted by the mobile terminal $a_i$ in the area S during the aggregation time period) in order of time, the estimation of the number of mobile terminals is to estimate the value of m from the observed location registration information $q_{ij}$ (j is an integer from 1 to $x_i$).

A calculation method for the estimation of the number of mobile terminals is described with reference to FIG. 21. Assume that the density of transmitting the location registration information $q_{ij}$ from the mobile terminal $a_i$ (which is the number of location registration information per unit time) is $p_i$. At this time, when the probability that the location registration information is transmitted is independent of area, an expected value $E(x_i)$ of the total number $x_i$ of location registration information transmitted by the mobile terminal $a_i$ in the area S during the aggregation time period is $E(x_i)=t_i \times p_i$, and the expected value $E(t_i)$ of the stay time $t_i$ of the mobile terminal $a_i$ in the area S during the aggregation time period is represented by the following equation (4).

$$E(t_i)=x_i/p_i \qquad (4)$$

When the transmitted time of the location registration information $q_{ij}$ is $u_{ij}$, the density $p_{ij}$ of the location registration information $q_{ij}$ is represented by the following equation (5).

$$p_{ij}=2/(u_{i(j+1)}-u_{i(j-1)}) \qquad (5)$$

When the location registration information $q_{ij}$ is the first location registration information, the location registration information corresponds to the second location registration information, and the location registration information $q_{i(j+1)}$ corresponds to the third location registration information. In this embodiment, a difference between the transmitted time $u_{i(j-1)}$ of the second location registration information $q_{i(j-1)}$ and the transmitted time $u_{i(j+1)}$ of the third location registration information $q_{i(j+1)}$, which is $(u_{i(j+1)}-u_{i(j-1)})$ of the equation (5) is used as a feature quantity $w_{ij}$ of the first location registration information. Accordingly, the above equation (5) can be represented as follows. In other words, the feature quantity $w_{ij}$ can be calculated in association with the inverse number of the density $p_{ij}$.

$$p_{ij}=2/(u_{i(j+1)}-u_{i(j-1)})=2/w_{ij} \qquad (6)$$

Because the density $p_i$ is given as $$p_i = x_i / E(t_i) = \left(x_i \bigg/ \sum_{j=1}^{x_i} w_{ij}\right) \times 2 \qquad (7)$$

the estimated value $E(m)$ of the number of mobile terminals m can be calculated by the following equation (8):

$$E(m) = \left(\sum_{i=1}^{n} \sum_{j=1}^{x_i} (w_{ij}/2)\right) \bigg/ T = \left(\sum_{i=1}^{n} \sum_{j=1}^{x_i} w_{ij}\right) \bigg/ 2T \qquad (8)$$

Figure 21:
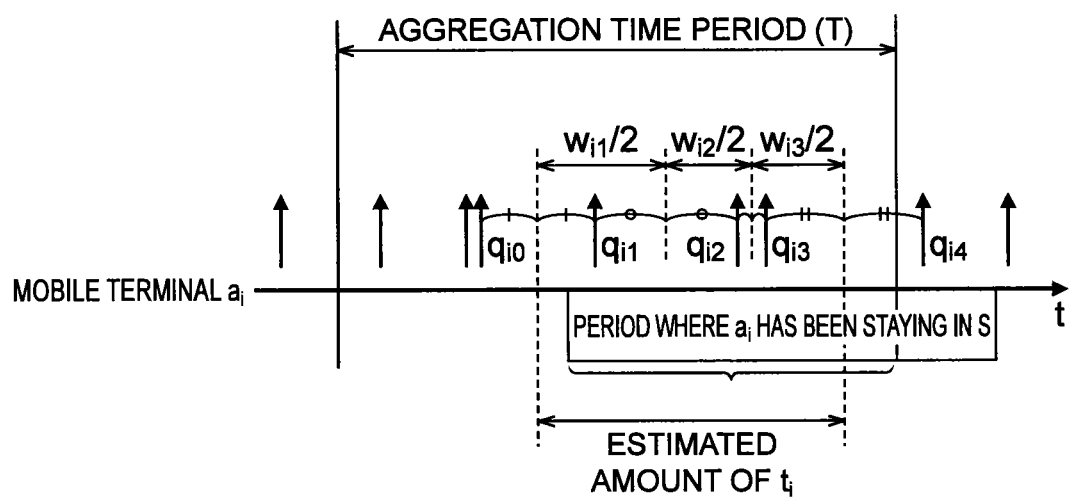
FIG. 21 is a view to describe a calculation method for terminal number estimation.

As shown in the example of FIG. 21, assume that, during the period which is within the aggregation time period and in which the mobile terminal $a_i$ stays in the area S, the mobile terminal $a_i$ transmits the location registration information $q_{i1}$, $q_{i2}$ and $q_{i3}$ and transmits the location registration information $q_{i0}$ immediately before the location registration information $q_{i1}$ and transmits the location registration information $q_{i4}$ immediately after the location registration information $q_{i3}$, and the transmitted times of the location registration information $q_{i0}$, $q_{i1}$, $q_{i2}$, $q_{i3}$ and $q_{i4}$ are $u_{i0}$, $u_{i1}$, $u_{i2}$, $u_{i3}$ and $u_{i4}$, respectively, the above concept is equivalent of estimating the stay time $t_i$ of the mobile terminal $a_i$ in the area S during the aggregation time period as a period from (a midpoint between $u_{i0}$ and $u_{i1}$) to (a midpoint between $u_{i3}$ and $u_{i4}$). Note that the mobile terminal $a_i$ transmits the location registration information $q_{i4}$ during the stay in the area S, though it is not within the aggregation time period. However, in order to maintain the unbiasedness of the estimated amount of the stay time $t_i$, a process in which the estimation is made not assuming that the end time of the stay time $t_i$ is the same as the end time of the aggregation time period T is described as an example.

As described above, the in-area terminal number acquisition unit 15D can obtain the feature quantity from the location registration information and estimate the number of mobile terminals in the area from the obtained feature quantity. In this case, it is possible to estimate the number of mobile terminals in the area more accurately. In the fourth embodiment also, like the fifth embodiment, the in-area terminal number acquisition unit 15D can obtain the feature quantity using the GPS information with area information and calculate the number of mobile terminals in the area from the obtained feature quantity.

An alternative example of the feature quantity is described hereinafter. In the fifth embodiment described above, an example in which a time difference between the location registration information before and after the location registration information for which the feature quantity is to be obtained (the first location registration information) (which is a time difference between the second location registration information and the third location registration information) is calculated as the feature quantity of the first location registration information is described. In this case, the feature quantity can be represented as the following equation (9). Note that the following equation (9) is deformation of the above equation (6), and it is equivalent of the equation (6) (i.e. the concept of the equation (6) is unchanged).

$$w_{ij}=u_{i(j+1)}-u_{i(j-1)} \qquad (9)$$

This alternative example is another variation of the calculation method of the feature quantity that is calculated in the in-area terminal number acquisition unit 15D.

In this alternative example, when calculating the feature quantity of the first location registration information, the in-area terminal number acquisition unit 15D takes type information (for example, the generation factor (generation timing) of the location registration information, which is described later) for the second location registration information and the third location registration information into consideration. Specifically, the in-area terminal number acquisition unit 15D calculates a value obtained by multiplying a time difference between the third location registration information and the first location registration information by a correction factor $\alpha$ corresponding to the type information (in this example, the generation factor) of the third location registration information and calculates a value obtained by multiplying a time difference between the first location registration information and the second location registration information by a correction factor $\beta$ corresponding to the type information (in this example, the generation factor) of the second location registration information. Note that, however, the in-area terminal number acquisition unit 15D may determine the correction factor $\alpha$ or $\beta$ in accordance with the type information of the first location registration information, determine the correction factor $\beta$ in accordance with the type information of the first and second location registration information or determine the correction factor $\alpha$ in accordance with the type information of the first and third location registration information. Then, the in-area terminal number acquisition unit 15D uses the sum of the values obtained by the multiplication as the feature quantity of the first location registration information. The calculation of the feature quantity in the in-area terminal number acquisition unit 15D is represented as the following equation (10).

$$w_{ij}=\alpha(u_{i(j+1)}-u_{ij})+\beta(u_{ij}-u_{i(j-1)}) \qquad (10)$$

As the type information of the second location registration information and the third location registration information, information about a generation factor of the location registration information may be used, for example, and the information about a generation factor is contained in the generated location registration information. The generation factor of the location registration information may be movement of the terminal across the location area boundary, generation based on the location registration performed periodically, execution of attachment upon power-on or the like of the terminal, execution of detachment upon power-off or a like of the terminal and so on, and set values of the correction factors α and β are determined in advance corresponding to such a generation factor. Then, the in-area terminal number acquisition unit 15D may set the correction factor α for the third location registration information in accordance with the information about the generation factor of the third location registration information, and set the correction factor β for the second location registration information in accordance with the information about the generation factor of the second location registration information. Note that the correction factors α and β may be both predetermined to be a value of 0 to 2. Note that, however, this numerical range is not essential.

In the case where the location of the mobile terminal 100 and the generation trigger of the location registration information are irrelevant such as the location registration information on the basis of periodical location registration, for example, the expected value of the stay time in the current area is considered to be the same before and after generation of the location registration information. On the other hand, in the case of the location registration information that is generated when the mobile terminal 100 moves across the location area boundary, it can be determined that the mobile terminal 100 has not been staying in the current area at least before the location registration information is generated. Therefore, assuming that the time when the mobile terminal 100 has been staying in the current area before the location registration information is generated is 0, and if the type information (generation factor) of the first location registration information is "across location area boundary", the correction factor β in the above equation (10) (which is the correction factor β about a time difference from the immediately previous location registration information) can be set to 0. It is thereby possible to calculate the feature quantity that more closely reflects the actual conditions.

Sixth Embodiment

In the following sixth and seventh embodiments, an example in which an estimated value (the number of terminals) in each area, which is a unit of aggregation, is converted into an estimated value in each unit of output (which is a mesh in this example) is described. In the sixth embodiment, a process in the environment where the communication area of an outdoor base station using a single frequency band exists is described, and, in the seventh embodiment, a process in the environment where two or more of the communication area of an indoor communication area and the communication areas of a plurality of outdoor base stations using frequency bands with different radio ranges geographically overlap is described. Note that when the unit of output and the unit of aggregation are the same, the conversion process described in the following sixth and seventh embodiments is not needed.

In the sixth embodiment, a terminal number estimation device that is implemented by adding the above-described conversion function into an estimated value for each mesh to the terminal number estimation device according to the first embodiment and its process are described.

Figure 22:
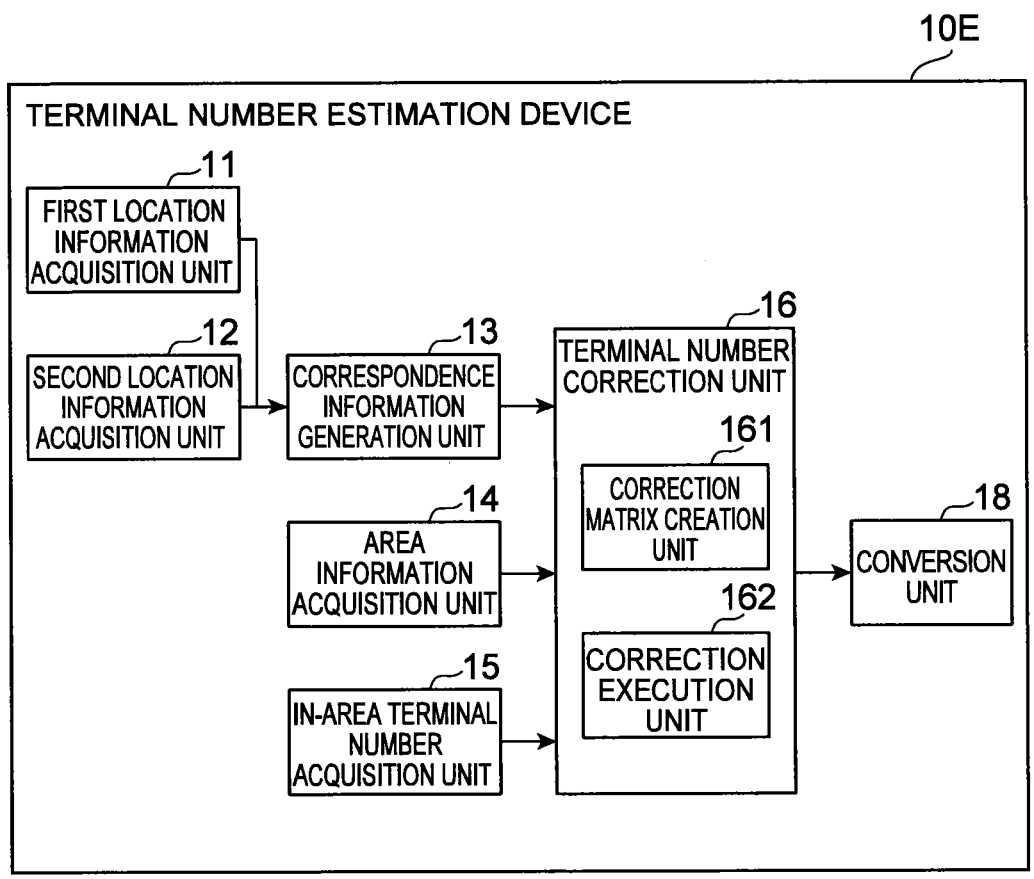
FIG. 22 is a block diagram showing a functional configuration of a terminal number estimation device according to a sixth embodiment.

As shown in FIG. 22, the functional block configuration of a terminal number estimation device 10E according to the sixth embodiment is a configuration in which a conversion unit 18 is added to the functional block configuration (FIG. 2) of the terminal number estimation device according to the first embodiment. The conversion unit 18 converts the number of terminals in each area corrected by the terminal number correction unit 16 into the number of terminals in each mesh by the following process.

Figure 23:
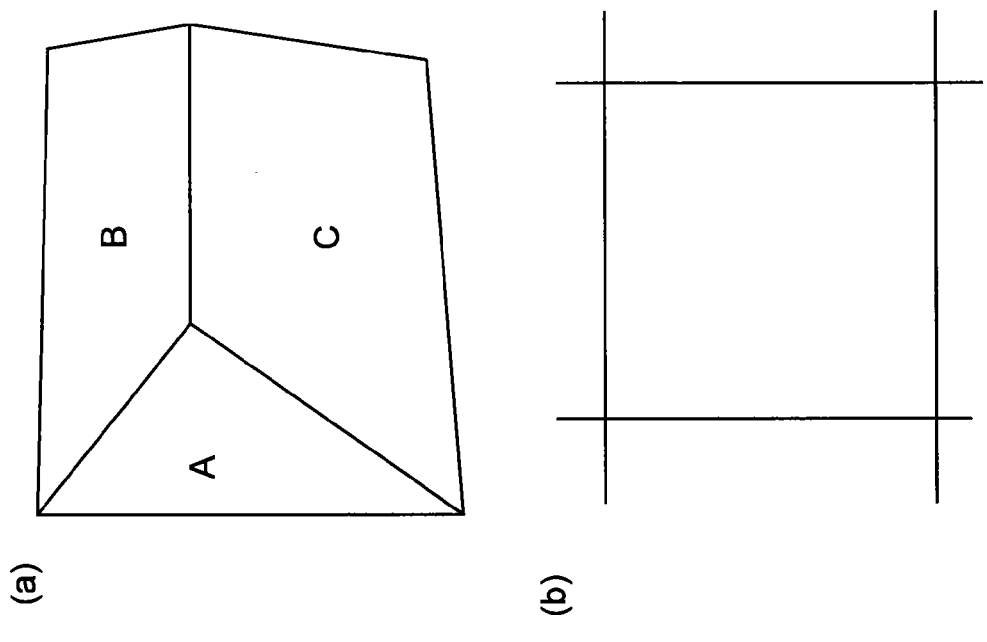
FIG. 23 is a view to describe a combination of a mesh and an area map.

The process of the conversion unit 18 is specifically described hereinafter with reference to FIG. 23. FIG. 23(*a*) is a view showing an area range, FIG. 23(*b*) is a view showing a mesh, and FIG. 23(*c*) is a view combining the area and the mesh.

Figure 24:
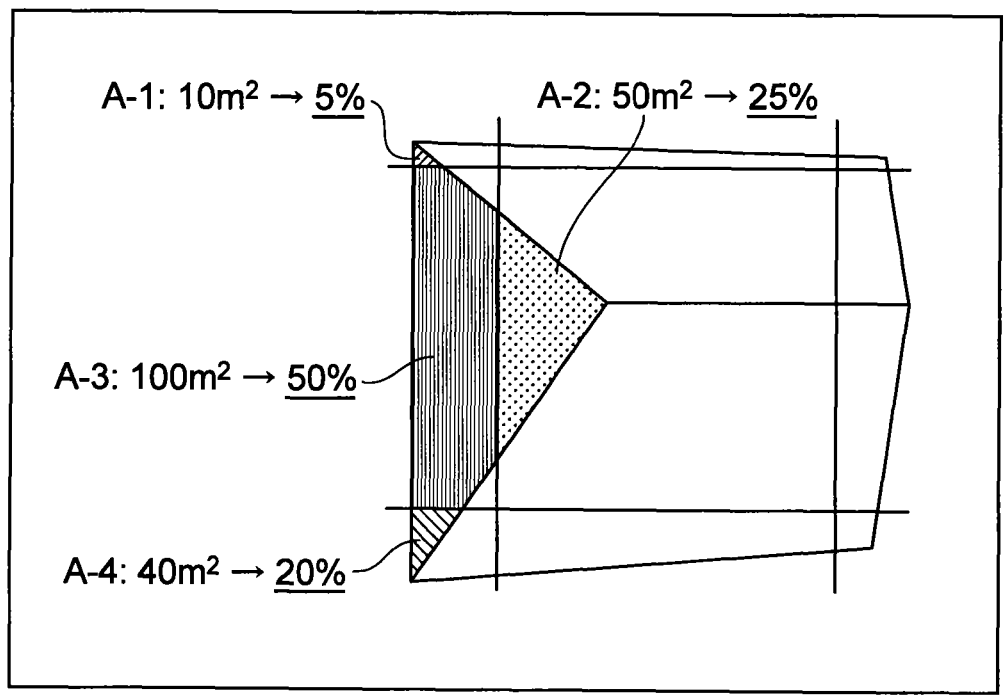
FIG. 24 is a view to describe calculation of the area of each divided area and an area ratio.

The conversion unit 18 combines an area diagram (see FIG. 23(*a*)) that is recreated based on prestored area boundary information and a two-dimensional mesh (see FIG. 23(*b*)) that is recreated based on a specified partition rule and thereby obtains a composition diagram as shown in FIG. 23(*c*). Next, the conversion unit 18 divides each area by the mesh boundary in the above composition diagram. For example, as shown in FIG. 24, the area A in FIG. 23(*a*) is divided into four divided areas A-1, A-2, A-3 and A-4 by the mesh boundary. Then, the conversion unit 18 calculates the area of each divided area and calculates the area ratio of the respective divided areas. For example, when 10 m$^2$, 50 m$^2$, 100 m$^2$ and 40 m$^2$ are calculated as the areas of A-1, A-2, A-3 and A-4, respectively, as shown in FIG. 24, 5%, 25%, 50% and 20% are calculated as the area ratio (for example, the percentage) of the divided areas A-1, A-2, A-3 and A-4, respectively.

Note that it is not essential for the conversion unit 18 to calculate the area ratio of the respective divided areas. For example, a configuration may be such that the area ratio of the respective divided areas is calculated in advance, and the conversion unit 18 refers to the information about the area ratio of the divided areas from a table, which is not shown, in the terminal number estimation device 10E or the outside.

Figure 25:
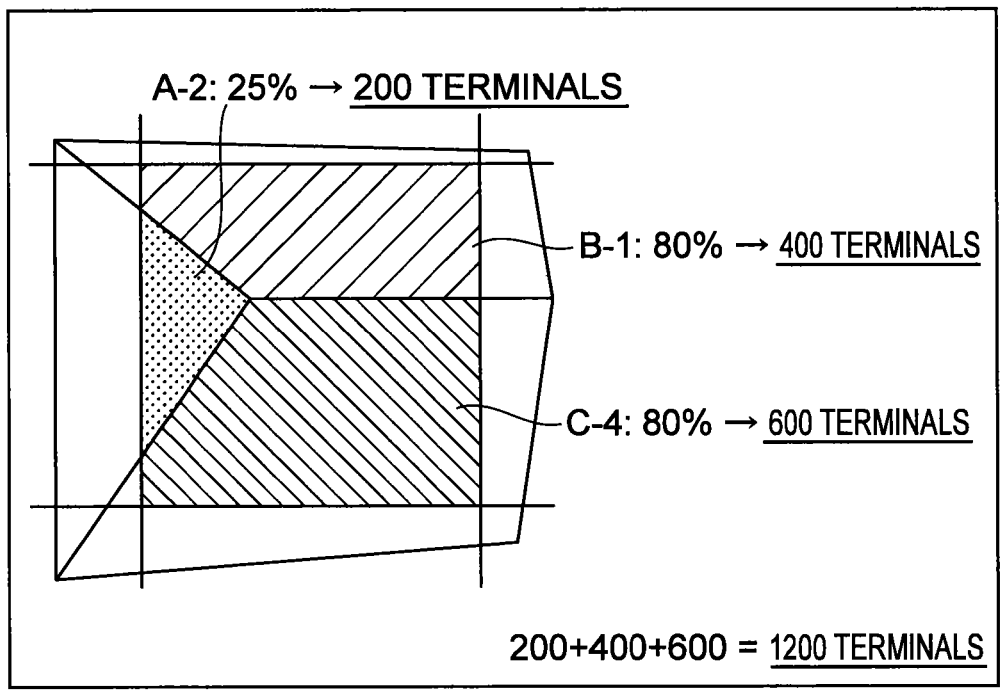
FIG. 25 is a view to describe calculation of the total population of divided areas in a certain mesh.

Next, the conversion unit 18 calculates the number of terminals in each divided area. For example, when the number of terminals in the area A of FIG. 23(*a*) is 800, 200 (i.e. 800× 25%) is calculated as the number of terminals in the divided area A-2 as shown in FIG. 25. Likewise, when the numbers of terminals in the area B and C are 500 and 750, respectively, 400 (i.e. 500×80%) is calculated as the number of terminals in the divided area B-1 which has the area ratio of 80% in the area B, and 600 (i.e. 750×80%) is calculated as the number of terminals in the divided area C-4 which has the area ratio of 80% in the area C.

Further, the conversion unit 18 calculates the total number of terminals in a plurality of divided areas included in one mesh and thereby calculates the number of terminals in the mesh. In the example of FIG. 25, the total number of terminals in the divided areas A-2, B-1 and C-4 included in one mesh is calculated as 1200 (i.e. 200+400+600), and 1200 is determined as the number of terminals in the mesh.

In this manner, in the environment where the communication area of an outdoor base station using a single frequency band exists, it is possible to convert the number of terminals in each unit of aggregation (area) into the number of terminals in each unit of output.

Note that, although in the sixth embodiment the process to convert the number of terminals in each unit of aggregation into the number of terminals in each unit of output is described on the basis of the first embodiment, the sixth embodiment may be applied also to the second to fifth embodiments described above. Further, the conversion process described in the sixth embodiment is also applicable to the case of converting the population in each unit of aggregation into the population in each unit of output, and the population in each unit of aggregation can be converted into the population in each unit of output by applying the process to the alternative example described with reference to FIG. 15.

Seventh Embodiment

In the seventh embodiment, an example in which an estimated value (the number of terminals) in each area (sector), which is a unit of aggregation, is converted into an estimated value in each unit of output (which is a mesh in this example) in the environment where two or more of the communication area of an indoor communication area and the communication areas of a plurality of outdoor base stations using frequency bands with different radio ranges geographically overlap is described.

Although the functional block configuration of a terminal number estimation device according to the seventh embodiment is the same as that of the sixth embodiment, the process in the conversion unit 18 is different, and therefore the process in the conversion unit 18 is described hereinafter with reference to FIGS. 26 and 27.

As shown in FIG. 26, in the environment where the communication area of an indoor base station and the communication areas of a plurality of outdoor base stations using frequency bands with different radio ranges (outdoor 2 GHz/1.7 GHz and outdoor 800 MHz) geographically overlap, the conversion unit 18 performs the conversion process described in the sixth embodiment for each of the communication areas and thereby calculates the number of terminals in each unit of output (mesh) for each communication area and finally adds up the number of terminals for the respective communication areas in each unit of output, thus obtaining the number of terminals in each unit of output.

In the example of FIG. 26, the conversion unit 18 first performs the conversion process described in the sixth embodiment for each of the communication area of the outdoor base station using outdoor 2 GHz/1.7 GHz, the communication area of the outdoor base station using outdoor 800 MHz and the communication area of the indoor base station. For example, assuming that the divided area where the output unit Q and the area A overlap has the area ratio of 40% with respect to the whole area A in the communication area of the outdoor base station using outdoor 2 GHz/1.7 GHz, the estimated number of terminals in the divided area where the output unit Q and the area A overlap is calculated as 40 by multiplying the estimated number of terminals in the area A, 100, by the area ratio 0.4. In the same manner, the estimated number of terminals in the divided area where the output unit Q and the area B overlap is calculated as 3 (the estimated number of terminals 30 in the area B×the area ratio 0.1) and the estimated number of terminals in the divided area where the output unit Q and the area C overlap is calculated as 5 (the estimated number of terminals 100 in the area C×the area ratio 0.05. For the communication area of the outdoor base station using outdoor 800 MHz also, the estimated number of terminals in the divided area where the output unit Q and the area D overlap is calculated as 3 (the estimated number of terminals 10 in the area D×the area ratio 0.3) and the estimated number of terminals in the divided area where the output unit Q and the area F overlap is calculated as 9 (the estimated number of terminals 30 in the area F×the area ratio 0.3). On the other hand, for the indoor base station, because the area of a radio range of each indoor base station is very small and the whole area L of one indoor base station overlaps with the output unit Q in the example of FIG. 26, the area ratio can be considered to be 100%. Thus, by multiplying the estimated number of terminals 100 in the area L, by the area ratio 1.0, the estimated number of terminals in the area where the output unit Q and the area L overlap (which is the whole area L in this example) is calculated as 10.

Finally, the conversion unit 18 adds up the estimated number of terminals in the areas where the output unit Q and the respective areas overlap obtained as above and thereby obtains the estimated number of terminals in the output unit Q, which is 70. In the above manner, it is possible to convert the number of terminals in each unit of aggregation into the number of terminals in each unit of output Q.

Although FIG. 26 shows the conversion into the estimated number of terminals in one output unit Q, the conversion may be made into the estimated number of terminals in all target output units by performing the same process for another output unit.

FIG. 27 shows a determinant for conversion into the estimated number of terminals in n number of target output units. Specifically, $Pop_{b_j}$ (where j is an integer of 1 to m (m is the number of aggregation units overlapping with any of the n number of target output units)) on the right-hand side of the equation in FIG. 27 indicates the number of terminals (estimated number of terminals) in each aggregation unit calculated by the terminal number correction unit 16, $Pop_{a_i}$ (where i is an integer of 1 to m) on the left-hand side indicates the number of terminals in each output unit, and $k_{b_j \to a_i}$ in the determinant on the right-hand side indicates a conversion factor for converting the number of terminals in the aggregation unit $b_j$ to the number of terminals in the output unit $a_i$. The conversion factor corresponds to the area ratio of the divided area to the whole area described above.

Each conversion factor in FIG. 27 can be calculated in advance from the positional relationship between the unit of estimation (area) and the unit of output (mesh), and by calculating each conversion factor in advance and storing the equation of FIG. 27, it is possible to convert the number of terminals (estimated number of terminals) in each unit of aggregation calculated by the estimation into the number of terminals in each unit of output easily and quickly with use of the equation of FIG. 27.

In the above manner, even in the environment where two or more of the communication area of an indoor communication area and the communication areas of a plurality of outdoor base stations using frequency bands with different radio ranges geographically overlap, it is possible to convert the number of terminals in each unit of aggregation into the number of terminals in each unit of output.

Further, although in the seventh embodiment the process to convert the number of terminals in each unit of aggregation into the number of terminals in each unit of output is described on the basis of the first embodiment, the seventh embodiment may be applied also to the second to fifth embodiments described above. Further, the conversion process described in the seventh embodiment is also applicable to the case of converting the population in each unit of aggregation into the population in each unit of output, and the population in each unit of aggregation can be converted into the population in each unit of output by applying the process to the alternative example described with reference to FIG. 15.

Eighth Embodiment

In an eighth embodiment, an embodiment in which before a certain estimated value (the number of terminals, population, etc.) is output, a hiding process is performed on the estimated value on the basis of a predetermined criterion is described.

Figure 28:
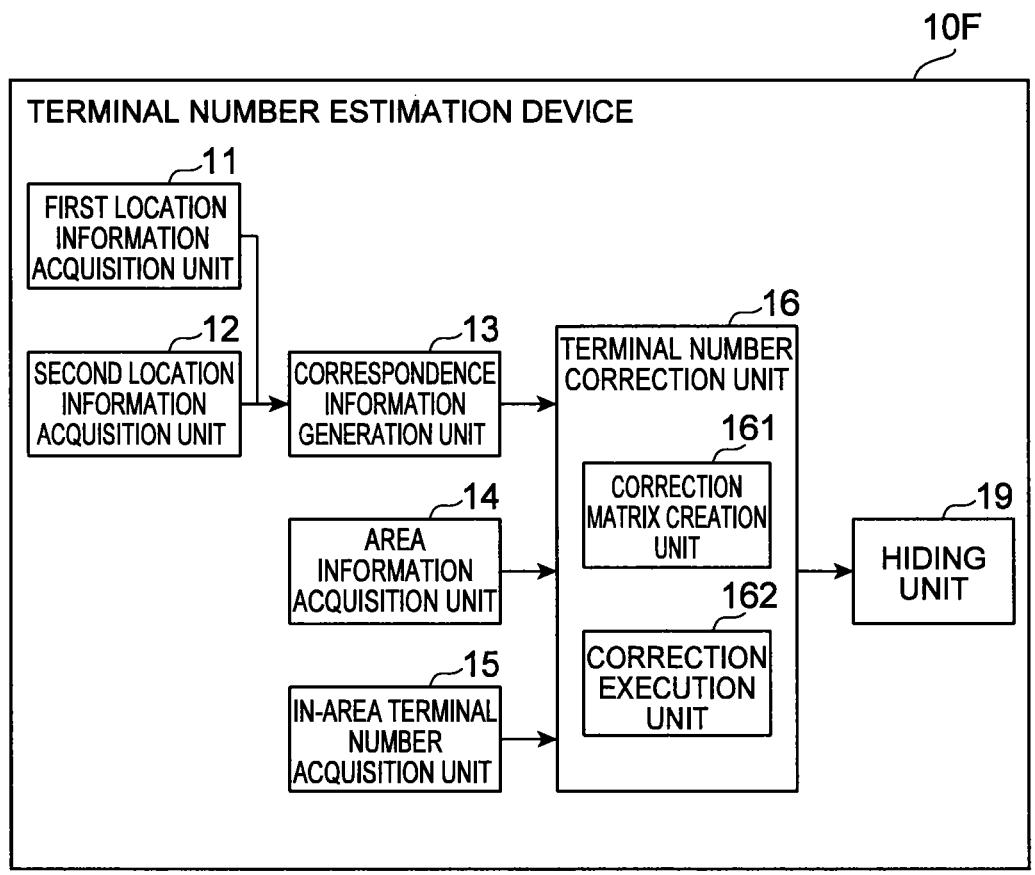
FIG. 28 is a block diagram showing a functional configuration of a terminal number estimation device according to an eighth embodiment.

As shown in FIG. 28, the functional block configuration of a terminal number estimation device 10F according to the eighth embodiment is a configuration in which a hiding unit 19 that performs a hiding process is added to the functional block configuration (FIG. 2) of the terminal number estimation device according to the first embodiment.

Figure 29:
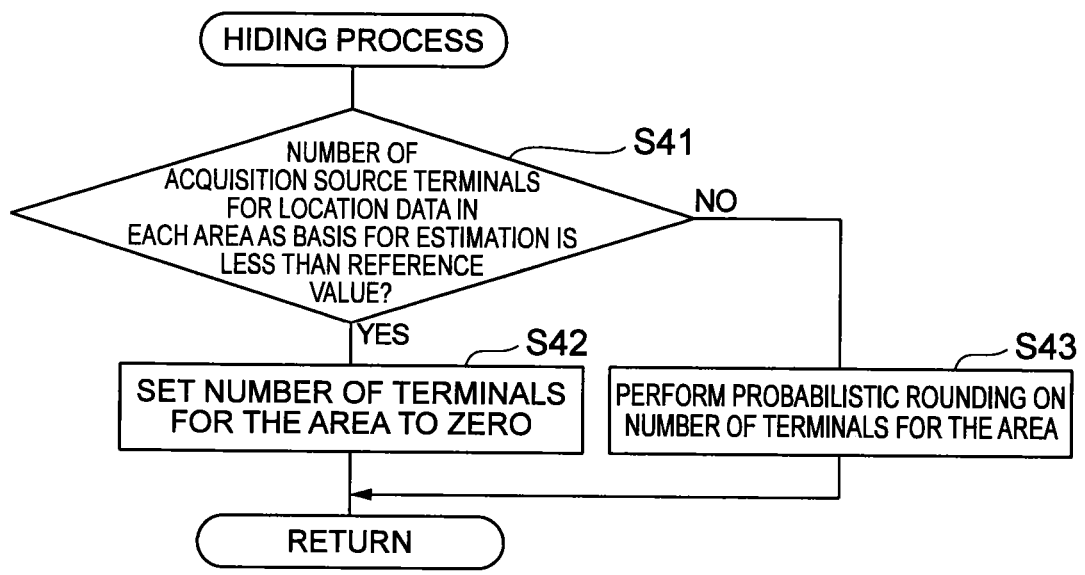
FIG. 29 is a flowchart showing an example of a hiding process.

The hiding unit 19 performs a hiding process shown in FIG. 29, for example, when it receives the number of terminals from the terminal number correction unit 16. Specifically, the hiding unit 19 acquires the number of acquisition source terminals indicating from how many terminals the location data of each area based on which the number of terminals acquired by the in-area terminal number acquisition unit 15 is estimated is acquired. The hiding unit 19 then determines whether the number of acquisition source terminals is less than a predetermined reference value (for example, 10) for determining that the hiding process is necessary or not (Step S41 in FIG. 29). Note that it is assumed that the number of terminals acquired by the in-area terminal number acquisition unit 15 is estimated based on the location data indicating the location of the mobile terminal 100. As one example, the number of acquisition source terminals may be added in advance to the number of terminals acquired by the in-area terminal number acquisition unit 15.

In Step S41, when the number of acquisition source terminals for the location data in each area as a basis for the estimation of the number of terminals is less than the reference value, the hiding unit 19 sets the number of terminals in this area to zero and thereby hides the number of terminals (Step S42). Note that the hiding method is not limited to setting the number of terminals to zero, and another method such as representing the number of terminals by a specified character or symbol (for example, "X" etc.) may be employed.

On the other hand, in Step S41, when the number of acquisition source terminals for the location data in each area as a basis for the estimation of the number of terminals is equal to or more than the reference value, the hiding unit 19 performs the following probabilistic rounding of a class width used in the estimation value output on the number of terminals in the area (Step S43). Specifically, assuming that the number of terminals in a certain area is x and the class width is k, the hiding unit 19 rounds the number of terminals x to $k(n+1)$ with the probability $(x-kn)/k$ and to kn with the probability $(k(n+1)-x)/k$ when $kn \leq x < k(n+1)$ (n is an integer).

For example, in the case where the number of terminals x is 23 and the class width k is 10, because $k \times 2 \leq x < k(2+1)$, n=2 and the number of terminals "23" is rounded to "30" with the probability 0.3 (with the probability of 30%) and to "20" with the probability 0.7 (with the probability of 70%).

By performing the above hiding process in the hiding unit 19, it is possible to avoid personal identification from the estimation result of the number of terminals and thereby enhance the usability of the estimation result. It is also possible to avoid inconvenience such that a hidden value is estimated from another value.

Further, the hiding process by the hiding unit 19 is not limited to the process shown in FIG. 29, and another process may be used. For example, when the determination in Step S41 of FIG. 29 results in NO, the processing of Step S43 may be skipped.

It should be noted that the terminal number estimation device and the terminal number estimation method according to the present invention are not limited to those described in the above embodiments. The terminal number estimation device and the terminal number estimation method according to the present invention may be those obtained by making various changes and modifications to the terminal number estimation device and the terminal number estimation method according to the embodiments without departing from the scope of the following claims or applying them to others.

For example, although the terminal number estimation device 10 to 10F is constructed in the peta mining unit 502 in the above embodiments, it may be constricted in another unit in the control center 500. Further, the terminal number estimation device 10 to 10F may be constructed in a server device outside the control center 500.

Further, the terminal number estimation device 10 to 10F may estimate the number of terminals in a specified area during a specified time period on a regular basis according to a periodical terminal number estimation instruction. Furthermore, the terminal number estimation device 10 to 10F may receive a terminal number estimation instruction from an external interface as needed and estimate the number of terminals in a desired area during a desired time period.

Further, in the terminal number estimation device 10A, the area range estimation unit 14a may be constructed outside the terminal number estimation device 10A. Further, in the terminal number estimation device 10B, the area range estimation unit 14a may be further included.

Further, although the first time information contained in the first location information is information indicating the time when the mobile terminal 100 has transmitted the first location information or the time when the control center 500 has received the first location information in the first to third and the fifth to eighth embodiments, it is not limited thereto. The first time information may be any information as long as it indicates the time related to transmission and reception of the first location information, and the time given in any of the communication system 1 may be used.

Furthermore, although the second time information contained in the second location information is information indicating the time when the mobile terminal 100 has transmitted the second location information or the time when the control center 500 has received the second location information in the first to third and the fifth to eighth embodiments, it is not limited thereto. The second time information may be any information as long as it indicates the time related to transmission and reception of the second location information, and the time given in any of the communication system 1 may be used.

Further, although the correspondence information generation unit 13 stores the correspondence information associating the area ID, the coordinate information and the time difference information in the correspondence information management table, the time difference information may be eliminated. For example, when a time difference between the time indicated by the first time information and the time indicated by the second time information is within a specified value, the correspondence information generation unit 13 may generate the correspondence information associating the area ID contained in the first location information and the coordinate information contained in the second location information, not associating the time difference information indicating the time difference.

Further, the correspondence information generation unit 13 may generate the correspondence information without using the time difference information. For example, the correspondence information generation unit 13 may extract the first location information acquired by the first location information acquisition unit 11 and the second location information acquired by the second location information acquisition unit 12 which have the same terminal ID and in which the time indicated by the first time information and the time indicated by the second time information are the same. The correspondence information generation unit 13 may then generate the correspondence information associating the area ID contained in the first location information and the coordinate information contained in the second location information. Further, in some cases the second location information contains the area ID. In such a case, the correspondence information generation unit 13 may generate the correspondence information using only the second location information.

Further, the area information acquisition unit 14a may estimate the area range in one estimation process without sequentially estimating the border from each adjacent area by the Bayesian method or the like.

Further, although the correction matrix creation unit 161b calculates the proportion of the number of correspondence information and the proportion of the number of first location registration terminals in another area with respect to a certain area, it may calculate the proportion of the number of correspondence information and the proportion of the number of first location registration terminals in each area with respect to the total number.

Further, the first to eighth embodiments described above may be implemented as a program module for executing the functions in the terminal number estimation device 10 to 10F. Specifically, the functions equal to those of the terminal number estimation device 10 to 10F described above may be implemented by reading a terminal number estimation program including as appropriate a first location information acquisition module corresponding to the first location information acquisition unit 11, a second location information acquisition module corresponding to the second location information acquisition unit 12, a correspondence information generation module corresponding to the correspondence information generation unit 13, an area information acquisition module corresponding to the area information acquisition unit 14, an in-area terminal number acquisition module corresponding to the in-area terminal number acquisition unit 15, a terminal number correction module corresponding to the terminal number correction unit 16, a correspondence information acquisition module corresponding to the correspondence information acquisition unit 11C on a computer system such as a server. The terminal number estimation program is provided by being stored in a storage medium such as a flexible disk, CD-ROM, DVD, ROM or the like or a semiconductor memory, for example. Further, the terminal number estimation program may be provided as a computer data signal superimposed on a carrier wave through a network.

Note that, in the above-described embodiments and alternative examples, a terminal ID for identifying a user of the mobile terminal 100 is added to the first location information, the second location information and the GPS information with area information. The terminal ID is information for distinguishing from another user, at least. Thus, the terminal ID may be obtained by performing an anonymization process including conversion into irreversible codes by a one-way function on information for identifying a user. As the one-way function, the keyed hash function on the basis of a hash function that is recommended by foreign and domestic rating projects or rating agencies may be used. The anonymization process may be performed in the first location information acquisition unit 11, the second location information acquisition unit 12 and the correspondence information acquisition unit 11C described above. Note that, however, the anonymization process may be performed in another unit.

REFERENCE SIGNS LIST

10~10F . . . terminal number estimation device, 11 . . . first location information acquisition unit (first location information acquisition means), 11C . . . correspondence information acquisition unit (correspondence information acquisition means), 12 . . . second location information acquisition unit (second location information acquisition means), 13 . . . correspondence information generation unit (correspondence information generation means), 14 . . . area information acquisition unit (area information acquisition means), 14a . . . area range estimation unit (area range estimation means), 15 . . . in-area terminal number acquisition unit (in-area terminal number acquisition means), 16,16b . . . terminal number correction unit (terminal number correction means), 17 . . . population estimation unit (population estimation means), 100 . . . mobile terminal (terminal), 161,161b . . . correction matrix creation unit, 162,162b . . . correction execution unit

The invention claimed is:

1. A terminal number estimation device comprising:
an area information acquisition unit that acquires area information containing area identification information identifying a location area of a terminal and area range information about an area range indicating a geographical range of an area identified by the area identification information;
an in-area terminal number acquisition unit that acquires a number of terminals located in an area identified by the area identification information; and
a terminal number correction unit that corrects the number of terminals acquired by the in-area terminal number acquisition unit based on correspondence information containing the area identification information and location information indicating a location of the terminal and the area information acquired by the area information acquisition unit.

2. The terminal number estimation device according to claim 1, further comprising:
a first location information acquisition unit that acquires first location information containing terminal identification information identifying the terminal and area identification information identifying a location area of the terminal; and
a second location information acquisition unit that acquires second location information containing the terminal identification and location information indicating a location of the terminal, wherein
the correspondence information contains at least one of first correspondence information generated by a correspondence information generation unit that generates correspondence information based on the area identification information and the location information by using the first location information acquired by the first location information acquisition unit and the second location information acquired by the second location information acquisition unit, and second correspondence information acquired by an correspondence information acquisition unit that acquires correspondence information containing the terminal identification information identifying the terminal, the area identification information identifying a location area of the terminal, and the location information indicating a location of the terminal.

3. The terminal number estimation device according to claim 2, wherein
the first location information further contains first time information indicating a time when the first location information is acquired,
the second location information further contains second time information indicating a time when the second location information is acquired, and
the correspondence information generation unit extracts the first location information and the second location information having the same terminal identification information and having a time difference between a time indicated by the first time information and a time indicated by the second time information being a specified value or less, and generates correspondence information based on the area identification information of the extracted first location information and the location information of the extracted second location information.

4. The terminal number estimation device according to claim 2, wherein
the first location information further contains first time information indicating a time when the first location information is acquired,
the second location information further contains second time information indicating a time when the second location information is acquired, and
the correspondence information generation unit extracts the second location information having the same terminal identification information as one first location information, the second location information being a specified number of second location information containing the second time information indicating a time earlier than a time indicated by the first time information contained in the one first time information and a specified number of second location information containing the second time information indicating a time later than a time indicated by the first time information contained in the one first time information, estimates location information indicating a location of a terminal at the time indicated by the first time information contained in the one first location information based on the second time information and the location information contained in each of the extracted second location information and the first time information contained in the one first location information, and generates correspondence information based on the estimated location information of the terminal and the area identification information of the one first location information.

5. The terminal number estimation device according to claim 3, wherein
when first observation target information containing at least one of observation target period information indicating a period to be observed and observation area information indicating an area to be observed is input from outside, the first location information acquisition unit acquires the first location information based on the first observation target information, and
when second observation target information containing at least one of observation target period information indicating a period to be observed and observation range information indicating a geographical range to be observed is input from outside, the second location information acquisition unit acquires the second location information based on the second observation target information.

6. The terminal number estimation device according to claim 1, further comprising:
an area range estimation unit that estimates an area range of an area identified by the area identification information based on the correspondence information, wherein
the area information acquisition unit acquires area range information indicating the area range estimated by the area range estimation unit and area identification information of the area as the area information.

7. The terminal number estimation device according to claim 1, wherein
the terminal number correction unit extracts a plurality of correspondence information having the same area identification information, determines actual location areas being areas to which locations indicated by the location information of the plurality of extracted correspondence information belong, calculates a proportion of the number of correspondence information in each of the actual location areas to a total number of the plurality of extracted correspondence information as a correction factor, and corrects the number of terminals using the correction factor.

8. The terminal number estimation device according to claim 7, wherein
the terminal number correction unit calculates a first proportion being a proportion of the number of correspondence information in each area, calculates a second proportion being a proportion of the number of terminals in each area by estimating the number of terminals whose location is registered for each area, calculates an adjustment factor of the same area based on the first proportion and the second proportion of the same area, and adjusts the correction factor based on the adjustment factor.

9. The terminal number estimation device according to claim 1, further comprising:
a population estimation unit that estimates a population of one user attribute based on the number of terminals corrected by the terminal number correction unit and a ratio of the number of in-area terminals having the one user attribute in a predetermined wide area and a population of the one user attribute included in the wide area based on statistical data.

10. A terminal number estimation device comprising:
a first location information acquisition unit that acquires first location information containing terminal identification information identifying a terminal and area identification information identifying a location area of the terminal;
a second location information acquisition unit that acquires second location information containing the terminal identification and location information indicating a location of the terminal;
a correspondence information generation unit that generates correspondence information based on the area identification information and the location information by using the first location information acquired by the first location information acquisition unit and the second location information acquired by the second location information acquisition unit;
an area information acquisition unit that acquires area information containing the area identification information and area range information about an area range indicating a geographical range of an area identified by the area identification information;
an in-area terminal number acquisition unit that acquires a number of terminals located in an area identified by the area identification information; and a terminal number correction unit that corrects the number of terminals acquired by the in-area terminal number acquisition unit based on the correspondence information generated by the correspondence information generation unit and the area information acquired by the area information acquisition unit.

11. A terminal number estimation method performed by a terminal number estimation device, comprising:
- an area information acquisition step of acquiring area information containing area identification information identifying a location area of a terminal and area range information about an area range indicating a geographical range of an area identified by the area identification information;
- an in-area terminal number acquisition step of acquiring a number of terminals located in an area identified by the area identification information; and
- a terminal number correction step of correcting the number of terminals acquired in the in-area terminal number acquisition step based on correspondence information containing the area identification information and location information indicating a location of the terminal and the area information acquired in the area information acquisition step.

12. A terminal number estimation method performed by a terminal number estimation device, comprising:
- a first location information acquisition step of acquiring first location information containing terminal identification information identifying a terminal and area identification information identifying a location area of the terminal;
- a second location information acquisition step of acquiring second location information containing the terminal identification and location information indicating a location of the terminal;
- a correspondence information generation step of generating correspondence information based on the area identification information and the location information by using the first location information acquired in the first location information acquisition step and the second location information acquired in the second location information acquisition step;
- an area information acquisition step of acquiring area information containing the area identification information and area range information about an area range indicating a geographical range of an area identified by the area identification information;
- an in-area terminal number acquisition step of acquiring a number of terminals located in an area identified by the area identification information; and
- a terminal number correction step of correcting the number of terminals acquired in the in-area terminal number acquisition step based on the correspondence information generated in the correspondence information generation step and the area information acquired in the area information acquisition step.

* * * * *